US011710093B2

(12) United States Patent
Baldassari et al.

(10) Patent No.: US 11,710,093 B2
(45) Date of Patent: *Jul. 25, 2023

(54) ENHANCED MULTI-LAYER CARGO SCREENING SYSTEM, COMPUTER PROGRAM PRODUCT, AND METHOD OF USING THE SAME

(71) Applicant: United Parcel Service of America, Inc., Atlanta, GA (US)

(72) Inventors: Tony Baldassari, Lake Hopatcong, NJ (US); Howard Stone, Ruddington (GB)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 529 days.

This patent is subject to a terminal disclaimer.

(21) Appl. No.: 16/510,500

(22) Filed: Jul. 12, 2019

(65) Prior Publication Data

US 2019/0354929 A1 Nov. 21, 2019

Related U.S. Application Data

(63) Continuation of application No. 15/099,869, filed on Apr. 15, 2016, now Pat. No. 10,366,364.

(Continued)

(51) Int. Cl.
*G06Q 10/08* (2023.01)
*G06Q 10/0832* (2023.01)

(52) U.S. Cl.
CPC ......... *G06Q 10/0832* (2013.01); *G06Q 10/08* (2013.01)

(58) Field of Classification Search
CPC .................. G06Q 10/0832; G06Q 10/08

(Continued)

(56) References Cited

U.S. PATENT DOCUMENTS 6,068,156 A 5/2000 Liff et al.
6,088,693 A 7/2000 Van Huben et al.
(Continued)

FOREIGN PATENT DOCUMENTS

CN 102799977 A 11/2012
CN 102812457 A 12/2012
(Continued)

OTHER PUBLICATIONS

Office Action received for Chinese Patent Application No. 201680022210.8, dated Mar. 4, 2020, 17 pages (1 page of English Translation and 16 pages of Official copy).

(Continued)

*Primary Examiner* — Fateh M Obaid
(74) *Attorney, Agent, or Firm* — Shook, Hardy & Bacon L.L.P.

(57) ABSTRACT

Computer program products, methods, systems, apparatus, and computing entities for enhanced cargo screening capabilities are provided. In one embodiment, the method comprises: automatically and electronically executing a first screening procedure for capturing and storing first screening data comprising (a) an x-ray image and (b) first screening decontrol data; automatically and electronically determining whether at least a second screening procedure is required, the determination involving identifying at least one discrepancy between at least a portion of the first screening data and at least one predefined parameter; responsive to determining that the second screening is required, generating and transmitting one or more notifications configured to initiate the second screening procedure within a predetermined period of time; and responsive to determining that the at least second screening is not required, generating and transmitting a decontrol message configured to release the packages from further automated screening procedures.

18 Claims, 16 Drawing Sheets

Related U.S. Application Data

(60) Provisional application No. 62/148,509, filed on Apr. 16, 2015.

(58) Field of Classification Search
USPC .................................................. 382/100
See application file for complete search history.

(56) References Cited

U.S. PATENT DOCUMENTS

| | | |
|---|---|---|
| 6,502,102 B1 | 12/2002 | Haswell et al. |
| 6,820,022 B2 | 11/2004 | Popp et al. |
| 7,233,682 B2* | 6/2007 | Levine .................. G06Q 10/08 378/57 |
| 7,499,522 B2 | 3/2009 | Chen et al. |
| 7,574,372 B2 | 8/2009 | Among et al. |
| 7,613,618 B2 | 11/2009 | Dillon et al. |
| 7,669,764 B2 | 3/2010 | Dearing et al. |
| 7,734,102 B2* | 6/2010 | Bergeron .................. G06T 7/70 382/209 |
| 7,899,232 B2 | 3/2011 | Gudmundson et al. |
| 3,146,814 A1 | 4/2012 | Mueller et al. |
| 8,322,044 B2 | 12/2012 | Gregory et al. |
| 8,381,976 B2 | 2/2013 | Mohideen et al. |
| 8,386,277 B2 | 2/2013 | Hearne et al. |
| 8,553,969 B1 | 10/2013 | Van De Vrande et al. |
| 8,596,546 B2 | 12/2013 | Learmonth et al. |
| 8,645,216 B2 | 2/2014 | Murphy et al. |
| 8,670,066 B2 | 3/2014 | Newcomb et al. |
| 8,861,816 B2 | 10/2014 | Lang et al. |
| 8,885,914 B2 | 11/2014 | Kim |
| 8,923,603 B2 | 12/2014 | Weston et al. |
| 8,941,645 B2 | 1/2015 | Grimaud |
| 2002/0032612 A1 | 3/2002 | Williams et al. |
| 2002/0176531 A1 | 11/2002 | Mcclelland et al. |
| 2003/0052169 A1* | 3/2003 | Tsikos ...................... G06K 7/10 235/454 |
| 2004/0078213 A1 | 4/2004 | Brice et al. |
| 2005/0008262 A1 | 1/2005 | Komiya et al. |
| 2005/0038758 A1 | 2/2005 | Hilbush et al. |
| 2005/0099292 A1* | 5/2005 | Sajkowsky ............ G06Q 10/08 340/10.51 |
| 2005/0119904 A1* | 6/2005 | Tissington ............. G06Q 10/08 705/332 |
| 2005/0182686 A1* | 8/2005 | Yo .......................... G06Q 30/06 348/E7.071 |
| 2006/0118631 A1 | 6/2006 | Lubow et al. |
| 2006/0206939 A1* | 9/2006 | Chang .................. H04L 63/145 726/22 |
| 2008/0306841 A1 | 12/2008 | Chang, II |
| 2009/0248319 A1* | 10/2009 | Call ...................... G01N 1/2202 702/22 |
| 2010/0083335 A1 | 4/2010 | Talbert |
| 2010/0094705 A1 | 4/2010 | Sitbon |
| 2010/0138037 A1 | 6/2010 | Adelberg et al. |
| 2010/0207741 A1 | 8/2010 | Gudmundson et al. |
| 2011/0052049 A1 | 3/2011 | Rajaraman et al. |
| 2011/0175727 A1 | 7/2011 | Aikaterinidis |
| 2012/0170809 A1 | 7/2012 | Picazo Montoya |
| 2012/0201434 A1 | 8/2012 | Natali et al. |
| 2012/0311718 A1 | 12/2012 | Mccarty |
| 2013/0088591 A1 | 4/2013 | Backlund |
| 2013/0101172 A1* | 4/2013 | Parikh ................ G06Q 10/0838 382/104 |
| 2013/0170732 A1 | 7/2013 | Gotou et al. |
| 2013/0230139 A1* | 9/2013 | Morton ................ G01V 5/0066 378/57 |
| 2013/0341403 A1 | 12/2013 | Uebe et al. |
| 2014/0003655 A1 | 1/2014 | Gopalakrishnan et al. |
| 2014/0040024 A1 | 2/2014 | Sitbon |
| 2014/0135588 A1 | 5/2014 | Al-Ali et al. |
| 2014/0146169 A1 | 5/2014 | Ollivier et al. |
| 2014/0181634 A1* | 6/2014 | Compain .............. G06F 40/166 715/234 |
| 2014/0351073 A1 | 11/2014 | Murphy et al. |
| 2014/0358740 A1 | 12/2014 | Lipsey et al. |
| 2014/0379613 A1 | 12/2014 | Nishitani et al. |
| 2015/0063539 A1 | 3/2015 | Hayler et al. |
| 2015/0084987 A1 | 3/2015 | Hicks |
| 2016/0104277 A1 | 4/2016 | Takamori |
| 2016/0134930 A1 | 5/2016 | Swafford |
| 2016/0307152 A1 | 10/2016 | Baldassari et al. |

FOREIGN PATENT DOCUMENTS

| | | |
|---|---|---|
| CN | 103150641 A | 6/2013 |
| EP | 2792853 A1 | 10/2014 |
| JP | 2001-88912 A | 4/2001 |
| JP | 2011-98828 A | 5/2011 |
| KR | 101290137 B1 | 4/2013 |
| WO | 2007/122221 A1 | 11/2007 |
| WO | 2010/002853 A2 | 1/2010 |
| WO | 2013/102900 A1 | 7/2013 |
| WO | 2013/191282 A1 | 12/2013 |
| WO | 2014/199040 A1 | 12/2014 |

OTHER PUBLICATIONS

International Preliminary Report on Patentability received for PCT Patent Application No. PCT/US2016/027701, dated Jun. 28, 2017, 7 pages.

International Search Report and Written Opinion received for PCT Patent Application No. PCT/US2016/027701, dated Jun. 24, 2016, 9 pages.

Non-Final Office Action received for U.S. Appl. No. 15/099,869, dated Nov. 30, 2018, 36 pages.

Notice of Allowance received for U.S. Appl. No. 15/099,869, dated Mar. 14, 2019, 9 pages.

Second Written Opinion received from International Preliminary Examining Authority for PCT Patent Application No. PCT/US2016/027701, dated Mar. 16, 2017, 6 pages.

* cited by examiner

ENHANCED MULTI-LAYER CARGO SCREENING SYSTEM, COMPUTER PROGRAM PRODUCT, AND METHOD OF USING THE SAME

CROSS-REFERENCE TO RELATED APPLICATIONS

This Application is a Continuation Application of U.S. Non-provisional application Ser. No. 15/099,869, entitled "ENHANCED MULTI-LAYER CARGO SCREENING SYSTEM, COMPUTER PROGRAM PRODUCT, AND METHOD OF USING THE SAME, and filed on Apr. 15, 2016, which in turn claims priority to and the benefits of U.S. Provisional Application No. 62/148,509, filed on Apr. 16, 2015, the contents of which are hereby incorporated by reference in their entirety.

BACKGROUND

With an ever-increasing demand for speed in screening of cargo (e.g., packages for air, ground, and/or water transport), new techniques and approaches are needed that not only satisfy those demands, but also maintain or improve scanning accuracy, consistency, and capacity, while simultaneously reducing staffing load requirements.

BRIEF SUMMARY

In general, embodiments of the present invention provide methods, apparatus, systems, computing devices, computing entities, and/or the like for providing an enhanced cargo screening capability as described below.

In accordance with one aspect, a computer-implemented method for screening a plurality of packages containing therein one or more items for transit via a common carrier is provided. In one embodiment, the method comprises the steps of: for at least one of the plurality of packages, automatically and electronically executing a first screening procedure for capturing and storing in at least one memory storage device first screening data associated with the at least one of the plurality of packages, the first screening data comprising (a) an x-ray image and (b) first screening decontrol data; automatically and electronically determining, via at least one computer processor, whether at least a second screening procedure of the at least one of the plurality of packages is required, the determination being based upon identification of at least one discrepancy between at least a portion of the first screening data and at least one predefined parameter; responsive to determining that the at least second screening is required, generating and transmitting, via the at least one computer processor, one or more notifications configured to initiate the second screening procedure within a predetermined period of time; and responsive to determining that the at least second screening is not required, generating and transmitting, via the at least one computer processor, a first decontrol message containing at least the first screening decontrol data, the first decontrol message being configured to release the at least one of the plurality of packages from further screening procedures.

In accordance with another aspect, a computer program product is provided. The computer program product may comprise at least one non-transitory computer-readable storage medium having computer-readable program code portions stored therein, the computer-readable program code portions comprising one or more executable portions configured for: for at least one of the plurality of packages, automatically and electronically executing a first screening procedure for capturing and storing screening data associated with the at least one of the plurality of packages, the first screening data comprising (a) an x-ray image and (b) first screening decontrol data; automatically and electronically determining whether at least a second screening procedure of the at least one of the plurality of packages is required, the determination being based upon identification of at least one discrepancy between at least a portion of the first screening data and at least one predefined parameter; responsive to determining that the at least second screening is required, generating and transmitting one or more notifications configured to initiate the second screening procedure within a predetermined period of time; and responsive to determining that the at least second screening is not required, generating and transmitting a first decontrol message containing at least the first screening decontrol data, the first decontrol message being configured to release the at least one of the plurality of packages from further screening procedures.

In accordance with yet another aspect, an apparatus comprising at least one processor and at least one memory including computer program code is provided. In one embodiment, the at least one memory and the computer program code may be configured to, with the processor, cause the apparatus to, for at least one of the plurality of packages, automatically and electronically executing a first screening procedure for capturing and storing in the at least one memory first screening data associated with the at least one of the plurality of packages, the first screening data comprising (a) an x-ray image and (b) first screening decontrol data; automatically and electronically determining whether at least a second screening procedure of the at least one of the plurality of packages is required, the determination being based upon identification of at least one discrepancy between at least a portion of the first screening data and at least one predefined parameter; responsive to determining that the at least second screening is required, generating and transmitting one or more notifications configured to initiate the second screening procedure within a predetermined period of time; and responsive to determining that the at least second screening is not required, generating and transmitting a first decontrol message containing at least the first screening decontrol data, the first decontrol message being configured to release the at least one of the plurality of packages from further screening procedures.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
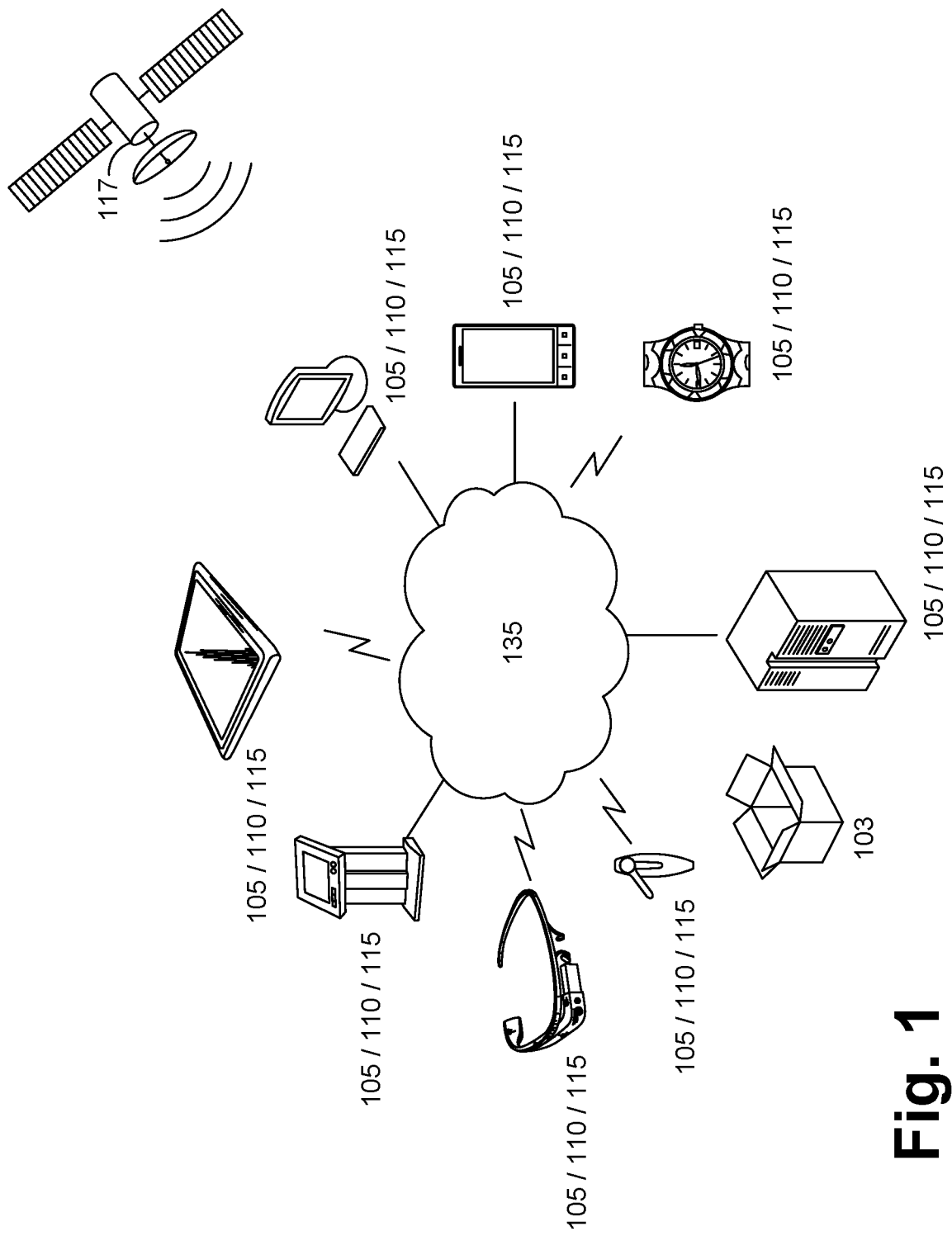
FIG. 1 is a diagram of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAIVI), non-volatile random-access memory (NVRAM), magnetoresistive random-access memory (MRAM), resistive random-access memory (RRAIVI), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAIVI), double data rate type two synchronous dynamic random access memory (DDR2 SDRAM), double data rate type three synchronous dynamic random access memory (DDR3 SDRAIVI), Rambus dynamic random access memory (RDRAM), Twin Transistor RAM (TTRAIVI), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a system that can be used in conjunction with various embodiments of the present invention. As shown in FIG. 1, the system may include one or more vehicles 100, one or more items/shipments 103, one or more carrier computing systems 105, one or more third party computing entities 110, one or more carrier personnel computing entities 115, one or more Global Positioning System (GPS) satellites 117, one or more networks 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), and/or the like.

Figure 11:
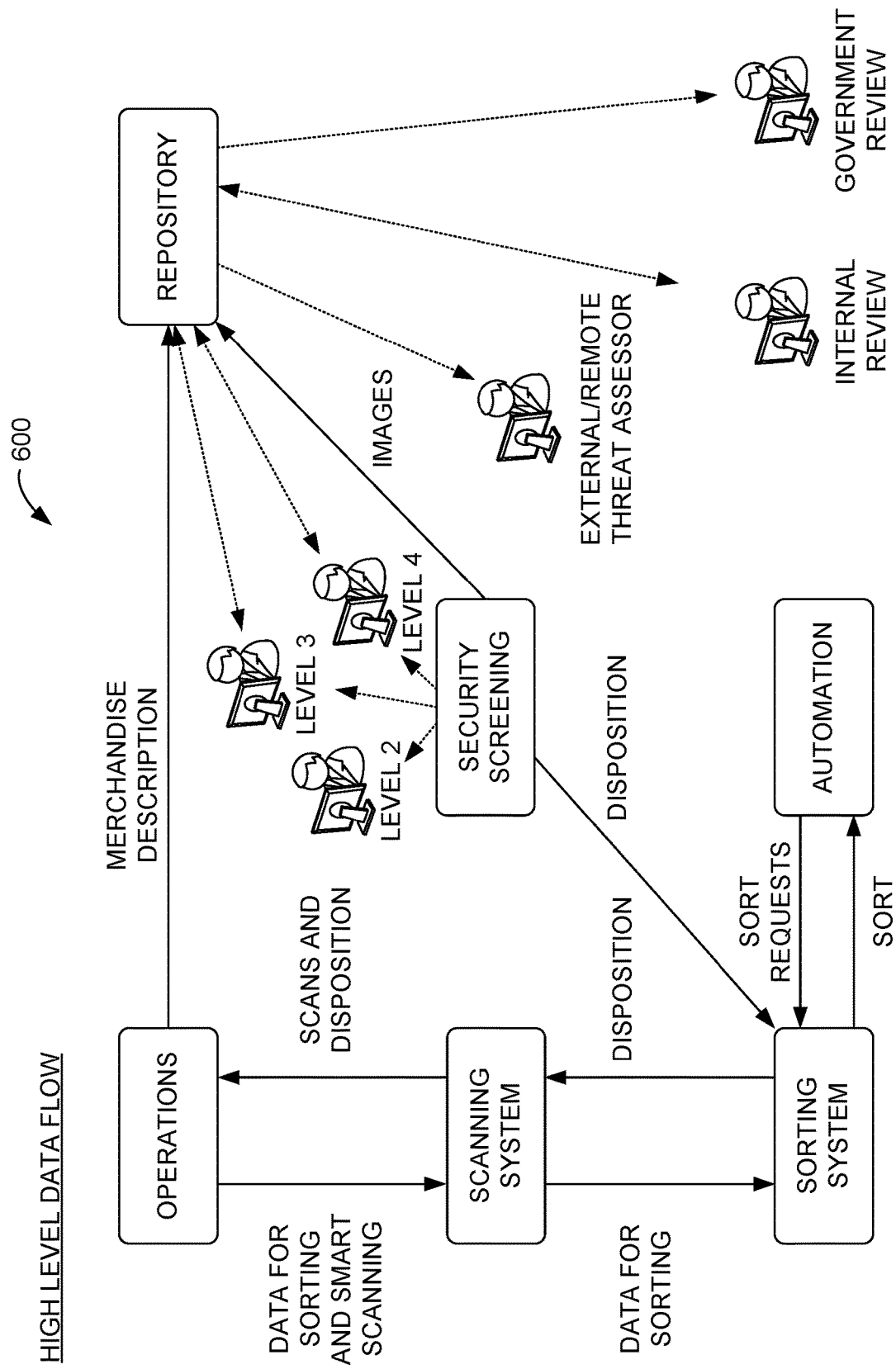
FIG. 11 is a diagram of an exemplary high level data flow that can occur in the system of FIG. 1 in accordance with various embodiments of the present invention.

Additionally, while FIG. 1 illustrates certain system entities as separate, standalone entities, the various embodiments are not limited to this particular architecture. Indeed, with reference also to FIG. 11, it may be understood therefrom the manner in which high level data flow may occur via various embodiments of the present invention. In FIG. 11, operations, a scanning system, and a sorting system—along with the automation associated therewith and the repository in which data is stored and maintained—may be considered analogous to the one or more carrier computing system 105 of FIG. 1. Security screening in FIG. 11, illustrating multiple users providing Level 2-4, external, internal, and/or government review may be understood as analogous to the entities 110/115 of FIG. 1. Of course, it should be understood that these comparisons between FIGS. 1 and 11 are non-limiting and exemplary, and will be detailed as well further below.

1. Exemplary Carrier Computing Entity

Figure 2:
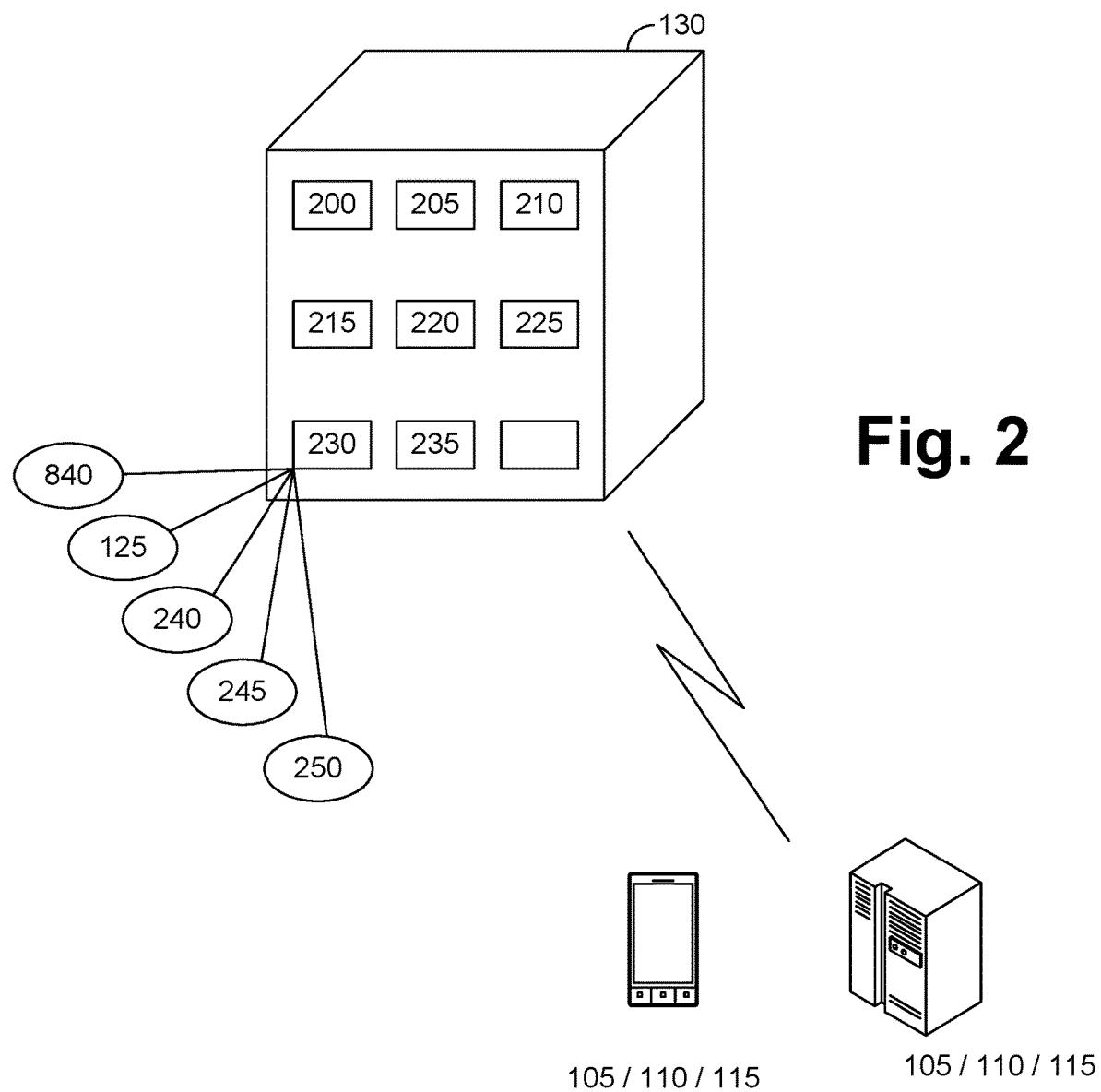
FIG. 2 is a diagram of an information/data collection device that may be used in association with certain embodiments of the present invention.

FIG. 2 provides a schematic of a carrier computing system 105 according to one embodiment of the present invention. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary information/data collection device 130 that may be attached, affixed, disposed upon, integrated into, or part of a vehicle 100.

The information/data collection device 130 may collect, receive, and/or otherwise store and/or maintain a variety of information/data (1Z/PTN, x-ray image data, other data required for a screening de-control message, and/or notification/mitigation data, all as described elsewhere herein) and transmit/send the information/data (same as outlined above and/or additional/alternative data) to various other computing entities via one of several communication methods.

In one embodiment, the information/data collection device 130 may include, be associated with, or be in wired or wireless communication with one or more processors 200 (various exemplary processors are described in greater detail below), one or more x-ray scanning systems 840, one or more sensors 125 (e.g., Global Navigation Satellite System (GNSS) sensors, or telematics sensors, or the like), one or more communication ports 230 for receiving information/data from various sensors (e.g., via a CAN-bus), one or more communication ports 205 for transmitting/sending data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be internal or external to the information/data collection device 130.

In one embodiment, the one or more sensors 125, modules, or similar words used herein interchangeably may be one of several components in wired or wireless communication with or available to the information/data collection device 130. Moreover, the one or more sensors 125 may be compatible with GPS satellites 117, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (CARRIER) coordinate systems; and/or the like. The one or more sensors 125 may be used to receive latitude, longitude, altitude, heading or direction, geocode, course, position, time, and/or speed information/data (e.g., referred to herein as telematics information/data and further described herein below). The one or more sensors 125 may also communicate with a variety of computing entities 105/110/115 as described elsewhere herein.

In one embodiment, the ECM 245 may be one of several components in communication with and/or available to the information/data collection device 130. The ECM 245, which may be a scalable and subservient device to the information/data collection device 130, may have information/data processing capability to decode and store analog and digital inputs from vehicle systems and sensors. The ECM 245 may further have information/data processing capability to collect and present package sorting information/data to the J-Bus (which may allow transmission to the information/data collection device 130), and output standard diagnostic codes when received from controllers 240 and/or sensors.

As indicated, a communication port 230 may be one of several components available in the information/data collection device 130 (or be in or as a separate computing entity). Embodiments of the communication port 230 may include an Infrared information/data Association (IrDA) communication port, an information/data radio, and/or a serial port. The communication port 230 may receive instructions for the information/data collection device 130. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol.

2. Exemplary Item

Figure 16:

In one embodiment, an item/shipment 103 may be any tangible and/or physical object. In one embodiment, an item/shipment 103 may be or be enclosed in one or more packages, envelopes, parcels, bags, goods, products, containers, loads, crates, items/shipments banded together, vehicle parts, pallets, drums, the like, and/or similar words used herein interchangeably. In one embodiment, each item/shipment 103 may include and/or be associated with item/shipment information/data. Some exemplary item/shipment information/data is shown in FIG. 16. As will be recognized, the item/shipment information/data may include an item/shipment identifier. Such item/shipment identifiers may be represented as text, barcodes, tags, character strings, Aztec Codes, MaxiCodes, Data Matrices, Quick Response (QR) Codes, electronic representations, and/or the like. A unique item/shipment identifier (e.g., 123456789) may be used by the carrier to identify and track the item/shipment 103 as it moves through the carrier's transportation network. Further, such item/shipment identifiers can be affixed to items/shipments 103 by, for example, using a sticker (e.g., label) with the unique item/shipment identifier printed thereon (in human and/or machine readable form) or an RFID tag with the unique item/shipment identifier stored therein. Such items/shipments may be referred to as "connected" items/shipments 103 and/or "non-connected" items/shipments 103.

In one embodiment, connected items/shipments 103 include the ability to determine their locations and/or communicate with various computing entities. This may include the item/shipment 103 being able to communicate via a chip or other devices, such as an integrated circuit chip, RFID technology, Near Field Communication (NFC) technology, Bluetooth technology, Wi-Fi technology, and any other suitable communication techniques, standards, or protocols with one another and/or communicate with various computing entities for a variety of purposes. Connected items/shipments 103 may include one or more components that are functionally similar to those of the carrier computing system 105 and/or the third party computing entity 110 and/or the carrier personnel entity 115, as described elsewhere herein. For example, in one embodiment, each connected item/shipment 103 may include one or more processing elements, one or more display device/input devices (e.g., including user interfaces), volatile and non-volatile storage or memory, and/or one or more communications interfaces. In this regard, in some example embodiments, an item/shipment 103 may communicate send "to" address information/data, received "from" address information/data, unique identifier codes, location information/data, status information/data, and/or various other information/data (all are generically referred to herein as item/shipment information/data.

In one embodiment, non-connected items/shipments 103 do not typically include the ability to determine their locations and/or might not be able communicate with various computing entities or are not designated to do so by the carrier. The location of non-connected items/shipments 103 can be determined with the aid of other appropriate computing entities. For example, non-connected items/shipments 103 can be scanned (e.g., affixed barcodes, RFID tags, and/or the like) or have the containers or vehicles in which they are located scanned or located. As will be recognized, an actual scan or location determination of an item/shipment 103 is not necessarily required to determine the location of an item/shipment 103. That is, a scanning operation might not actually be performed on a label affixed directly to an item/shipment 103 or location determination might not be made specifically for or by an item/shipment 103. For example, a label on a larger container housing many items/shipments 103 can be scanned, and by association, the location of the items/shipments 103 housed within the container are considered to be located in the container at the scanned location. These can be referred to as "logical" scans/determinations or "virtual" scans/determinations. Thus, the location of the items/shipments 103 is based on the assumption they are within the container, despite the fact that one or more of such items/shipments 103 might not actually be there.

3. Exemplary Carrier Computing System

Figure 3:
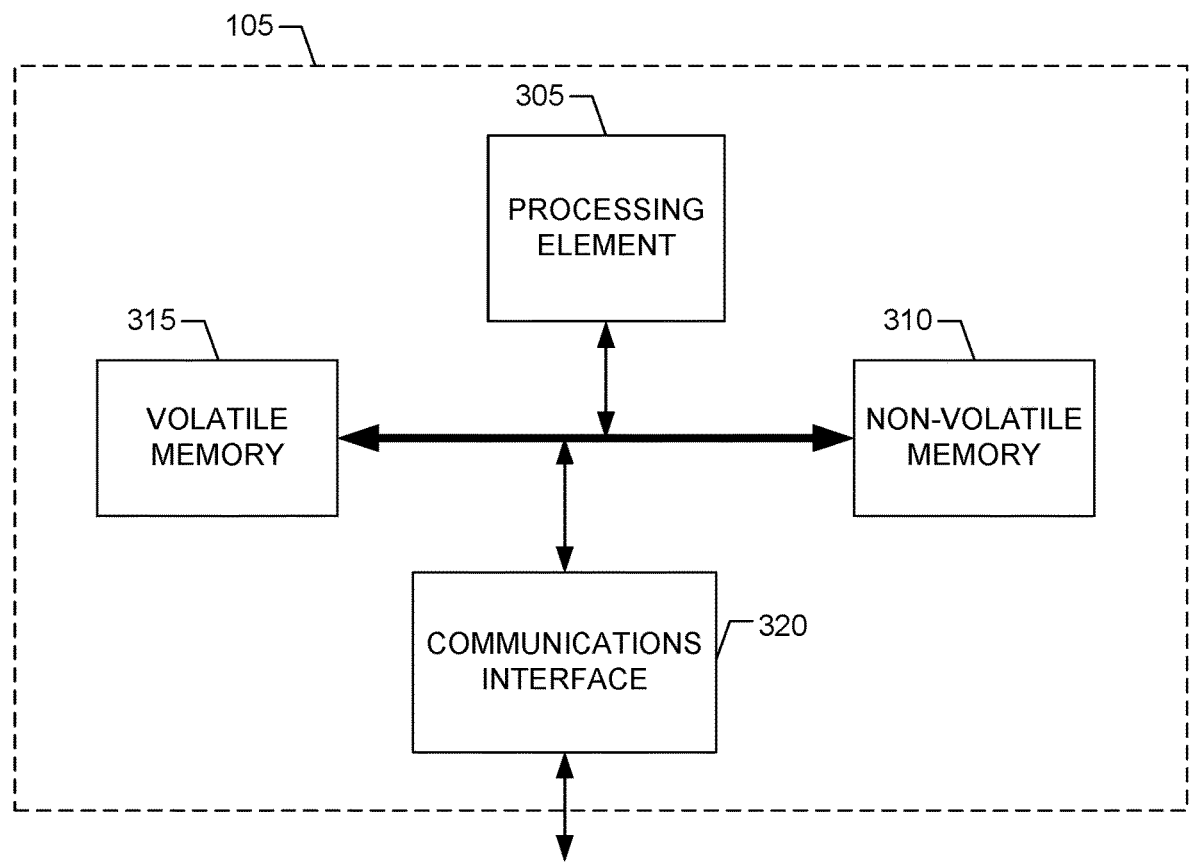
FIG. 3 is a schematic of a carrier computing system in accordance with certain embodiments of the present invention.

FIG. 3 provides a schematic of a carrier computing system 105 according to one embodiment of the present invention. A carrier may be a traditional carrier, such as United Parcel Service, FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowd-sourcing services, and/or the like. A carrier computing system 105 may be located at a carrier location and/or the like, such as a carrier service center, will call, kiosk, drop-box, locker system, hub, facility, and/or the like. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier computing system 105 may also include one or more communications interfaces 320 for communicating with various computing entities, such as by communicating data, content, information, and/or similar terms used herein interchangeably that can be transmitted, received, operated on, processed, displayed, stored, and/or the like. The carrier computing system 105 can also be used for making, receiving, and/or transferring payments. Payments may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, Bluetooth low energy (BLE), and various other contactless payment systems. Further, such payment technologies may include PayPal Beacon, Booker, Erply, Leaf, Apple Pay, Leapset, Micros, PayPal Here, Revel, ShopKeep, TouchBistro, Vend, and/or the like.

As shown in FIG. 3, in one embodiment, the carrier computing system 105 may include or be in communication with one or more processing elements 305 (also referred to as processors, processing circuitry, and/or similar terms used herein interchangeably) that communicate with other elements within the carrier computing system 105 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the carrier computing system 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the carrier computing system 105 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the carrier computing system 105 with the assistance of the processing element 305 and operating system.

As indicated, in one embodiment, the carrier computing system 105 may also include one or more communications interfaces 320 for communicating with various computing entities, such as by communicating data, content, information, and/or similar terms used herein interchangeably that can be transmitted, received, operated on, processed, displayed, stored, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier computing system 105 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the carrier computing system 105 may include or be in communication with one or more input elements, such as a keyboard input, a mouse input, a touch screen/display input, audio input, pointing device input, joystick input, keypad input, and/or the like. The carrier computing system 105 may also include or be in communication with one or more output elements (not shown), such as audio output, video output, screen/display output, motion output, movement output, and/or the like.

As will be appreciated, one or more of the carrier computing system's 105 components may be located remotely from other carrier computing system 105 components, such as in a distributed system. Furthermore, one or more of the components may be combined and additional components performing functions described herein may be included in the carrier computing system 105. Thus, the carrier computing system 105 can be adapted to accommodate a variety of needs and circumstances.

4. Exemplary Third Party Computing Entity

A third party may be anyone external to the carrier (e.g., an external security assessor or a government-employed individual, company, organization, department, or entity, or a representative of an organization and/or person, and/or the like.

Figure 4:
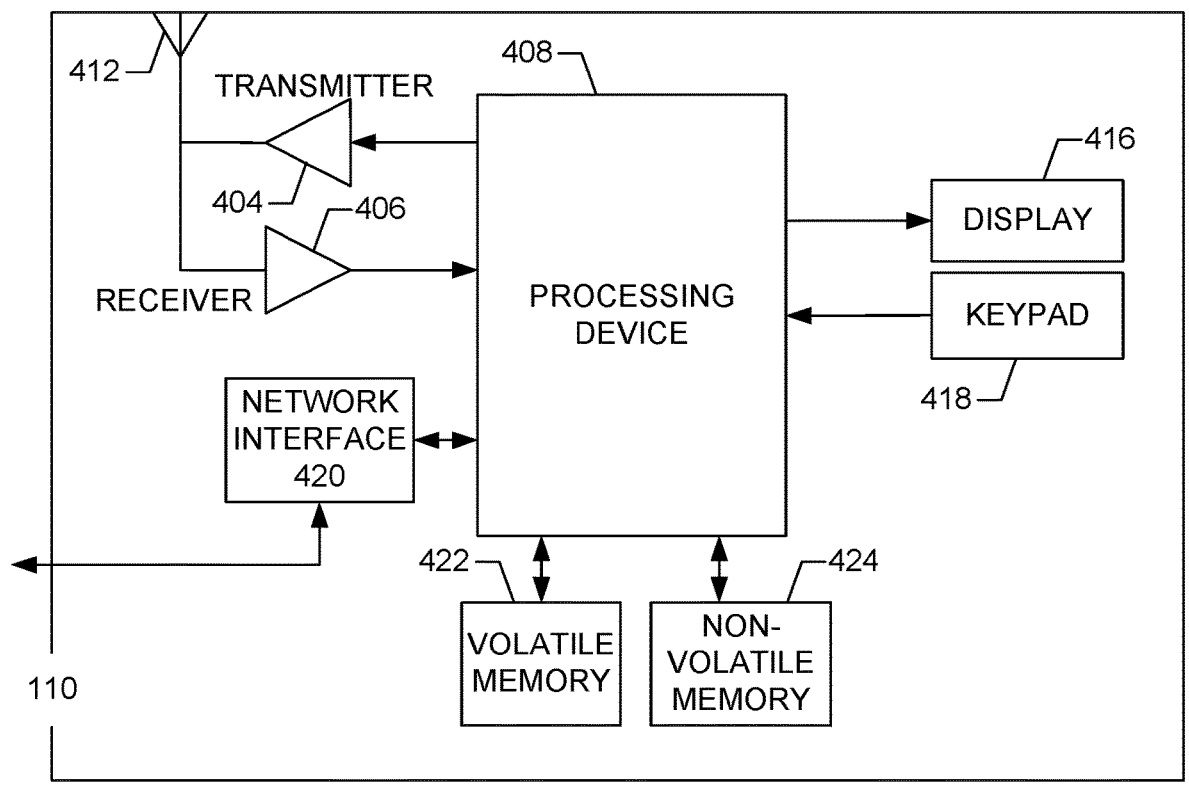
FIG. 4 is a schematic of a customer computing entity in accordance with certain embodiments of the present invention.

FIG. 4 provides an illustrative schematic representative of a third party computing entity 110 that can be used in conjunction with embodiments of the present invention. In one embodiment, the third party computing entities 110 may include one or more components that are functionally similar to those of the carrier computing system 105 and/or as described below. As shown in FIG. 4, a third party computing entity 110 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as the carrier computing system 105 and/or the like. In this regard, the third party computing entity 110 may be capable of operating with one or more air interface standards, communication protocols, modulation types, and access types. More particularly, the third party computing entity 110 may operate in accordance with any of a number of wireless communication standards and protocols. In a particular embodiment, the third party computing entity 110 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the customer computing entity 110 can communicate with various other entities using concepts such as Unstructured Supplementary Service information/data (US SD), Short Message Service (SMS), Multimedia Messaging Service (MIMS), Dual-Tone Multi-Frequency Signaling (DTMF), and/or Subscriber Identity Module Dialer (SIM dialer). The customer computing entity 110 can also download changes, add-ons, and updates, for instance, to its firmware, software (e.g., including executable instructions, applications, program modules), and operating system. For example, in one embodiment, the c third party computing entity 110 may store and execute a carrier application to assist in communicating with the carrier and/or for providing location services regarding the same.

According to one embodiment, the third party computing entity 110 may include location determining aspects, devices, modules, functionalities, and/or similar words used herein interchangeably. For example, the third party computing entity 110 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the customer computing entity's 105 position in connection with a variety of other systems, including cellular towers, Wi-Fi access points, and/or the like. Similarly, the customer computing entity 110 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, NFC transmitters, and/or the like. These indoor positioning aspects can be used in a variety of settings to determine the location of someone or something to within inches or centimeters.

The third party computing entity 110 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the third party computing entity 110 to interact with and/or cause display of information. The user input interface can comprise any of a number of devices allowing the third party computing entity 110 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the third party computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the customer computing entity can collect contextual information/data as detailed elsewhere herein.

The third party computing entity 110 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the third party computing entity 110.

5. Exemplary Carrier Personnel Computing Entity

As will be recognized, carrier personnel computing entities 115 can be operated by various parties, including a carrier pick-up/delivery person and/or operators of vehicles 100. For example, a user may be a carrier sorting/screening/operational package transit assembly line person tasked with a variety of screening, sorting, handling, and/or supervisory tasks related to the processing impending transit of one or more items/packages within the carrier transportation network.

Moreover, a carrier personnel computing entity 115 may include one or more components that are functionally similar to those of the carrier computing system 105 and/or the customer computing entity 110 and vice-versa. For example, in one embodiment, each carrier personnel computing entity 115 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, and/or similar words used herein interchangeably executing on and/or accessible via the carrier personnel computing entity 115 to interact with and/or cause display of information/data from various other computing entities. As will be recognized, these architectures and descriptions are provided for exemplary purposes only and are not limiting to the various embodiments.

III. Exemplary System Operation

Figure 12:
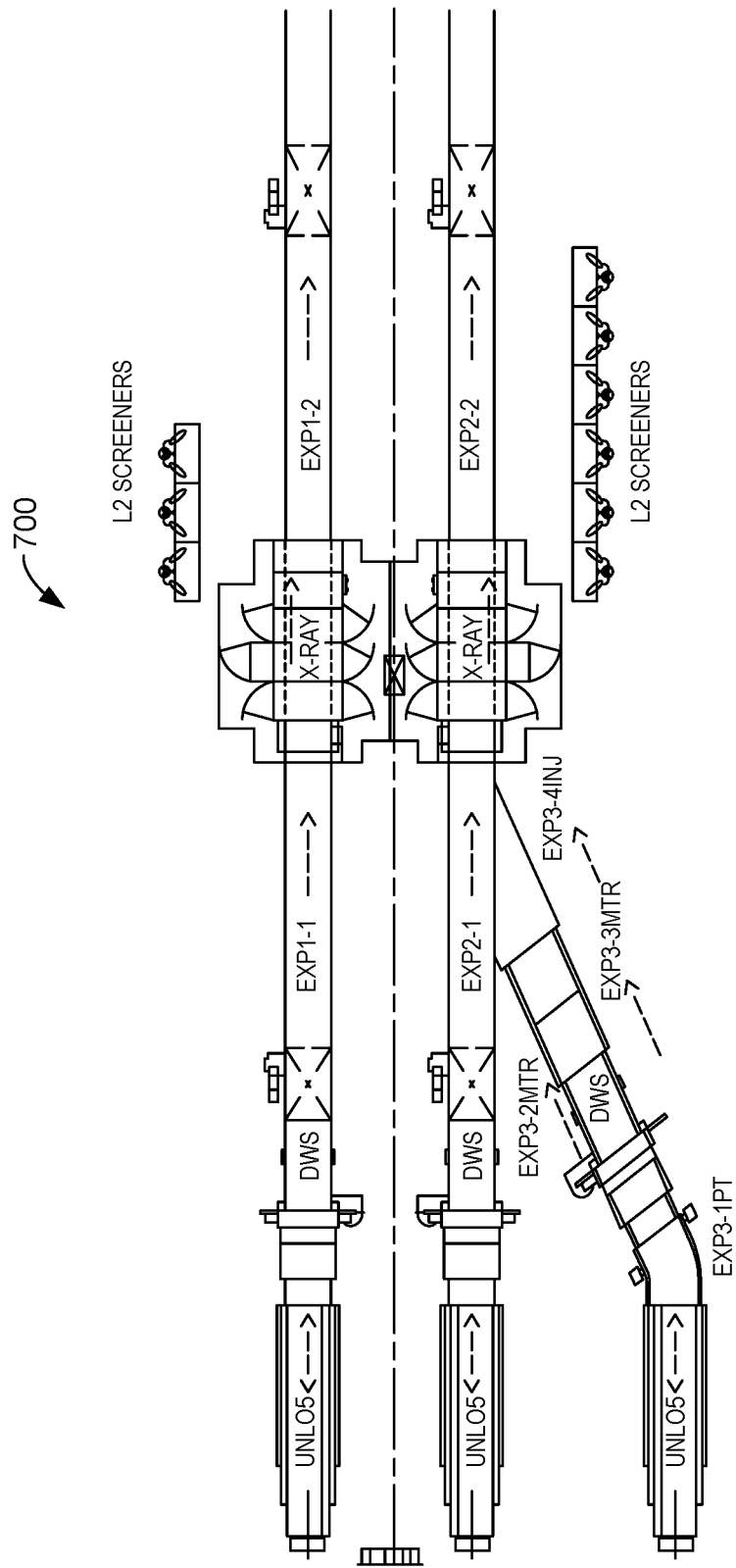
FIG. 12 is a diagram of an exemplary facility layout for implementation of the system of FIG. 1 in accordance with various embodiments of the present invention.
Figure 13:
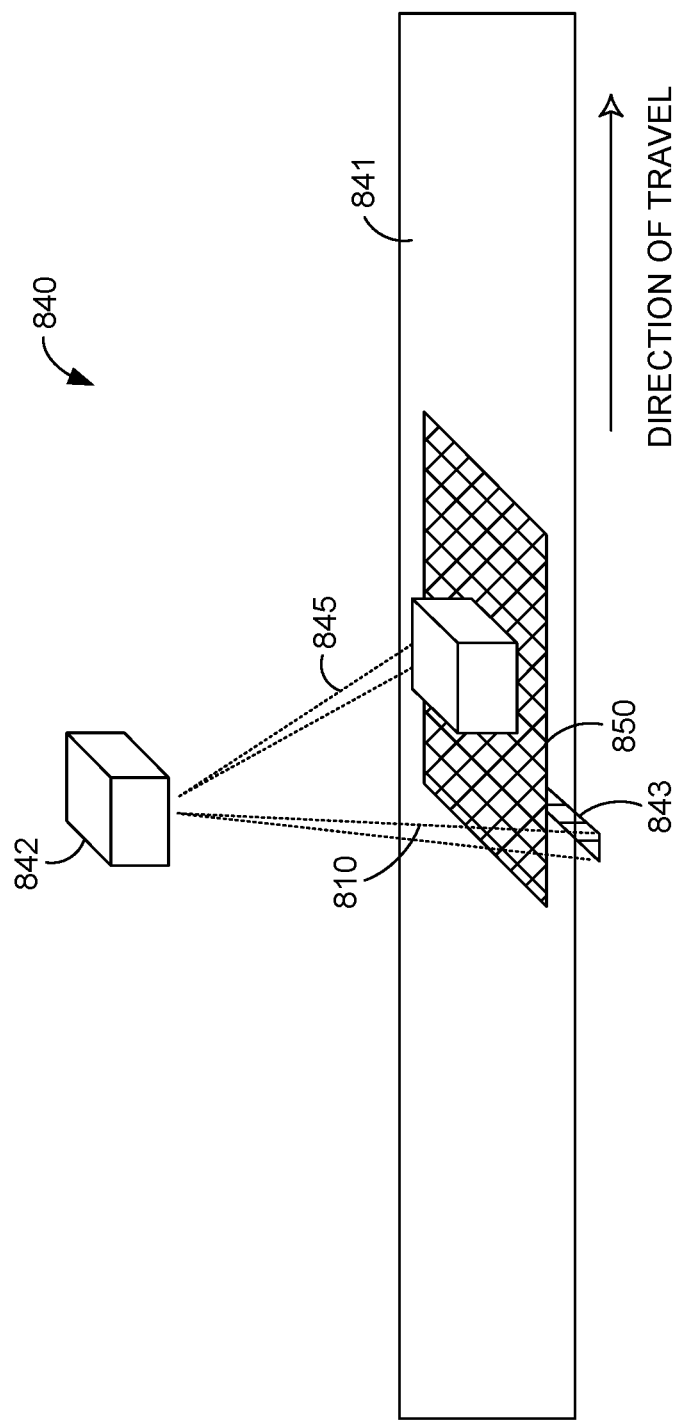
FIG. 13 is a schematic diagram of an x-ray scanning system containing therein an x-ray emitter, a detector, and an x-ray penetration grid (XPG) that may be utilized in conjunction with the system of FIG. 1 in accordance with various embodiments of the present invention.
Figure 14:
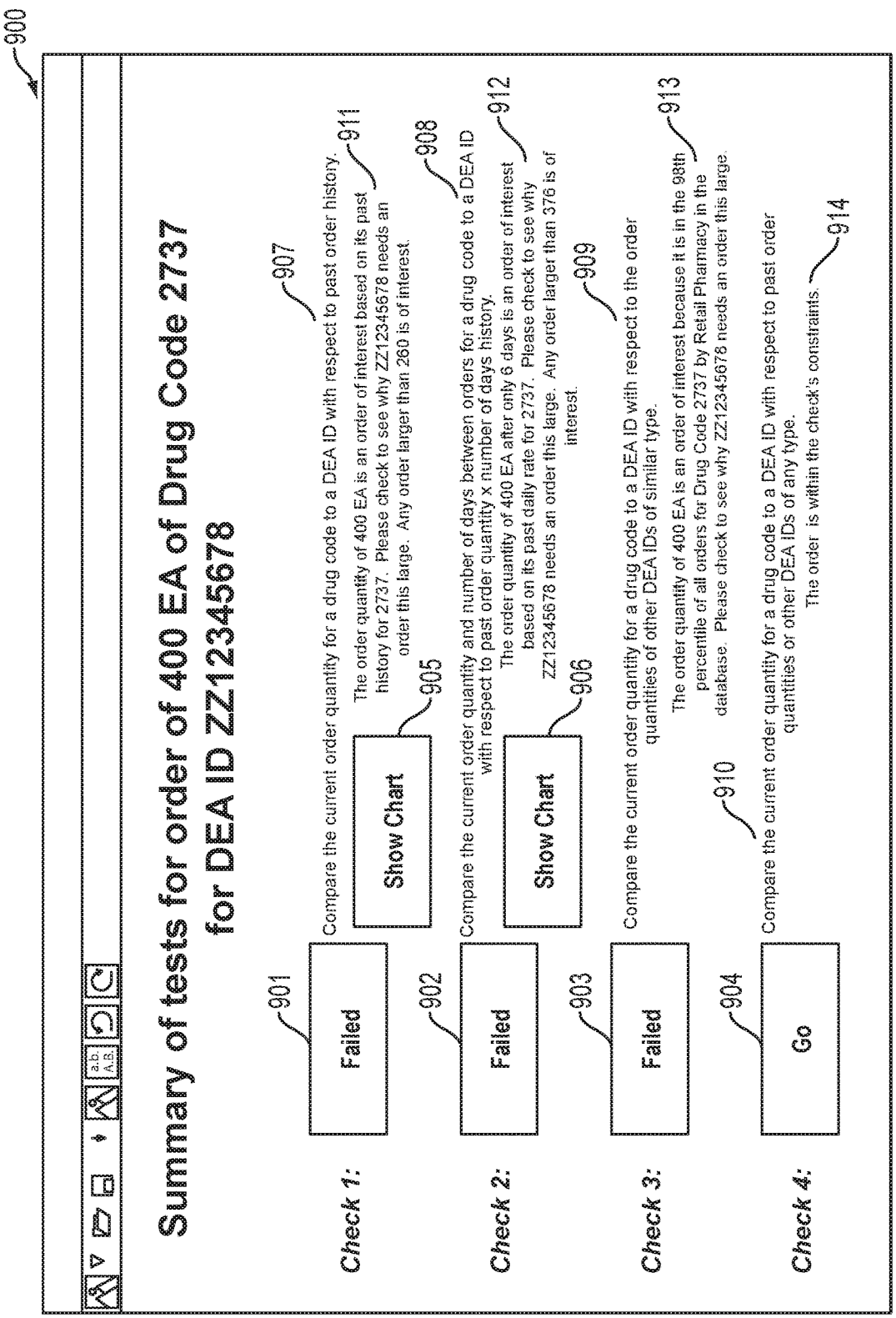
FIGS. 14-16 are exemplary input received by and output produced in accordance with various embodiments of the present invention.

Reference will now be made to FIGS. 5-16. FIGS. 5-10 are flowcharts illustrating operations and processes that can be used in accordance with various embodiments of the present invention. FIG. 11 is a diagram of an exemplary high level data flow that can occur in the system of FIG. 1 in accordance with various embodiments of the present invention. FIG. 12 is a diagram of an exemplary facility layout for implementation of the system of FIG. 1 in accordance with various embodiments of the present invention. FIG. 13 is a schematic diagram of an x-ray scanning system containing therein an x-ray emitter, a detector, and an x-ray penetration grid (XPG) that may be utilized in conjunction with the system of FIG. 1 in accordance with various embodiments of the present invention. FIGS. 14-16 are exemplary input received by and output produced in accordance with various embodiments of the present invention.

1. High Level Operation/Data Flow

Figure 5:
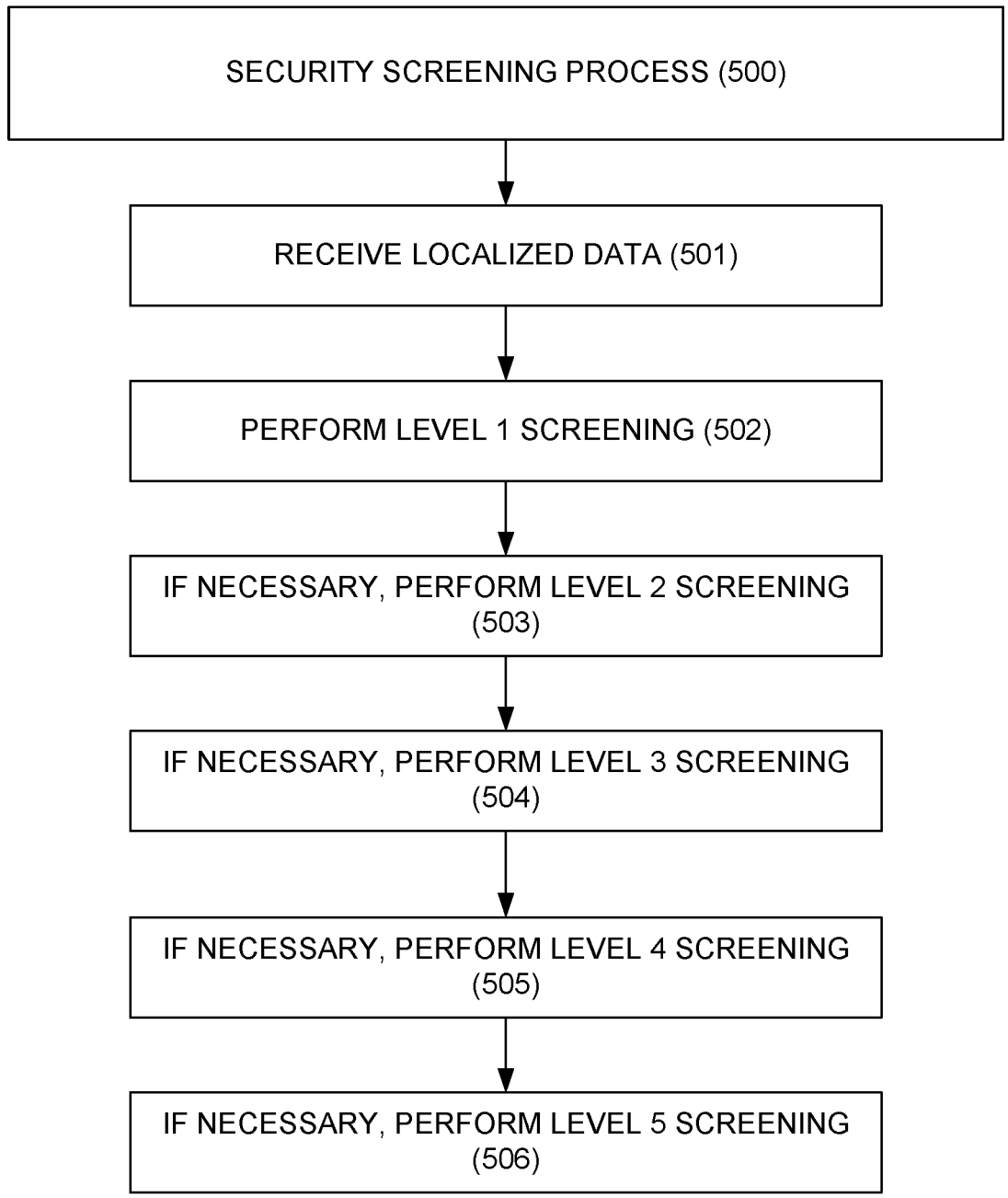
FIGS. 5-10 are flowcharts illustrating operations and processes that can be used in accordance with various embodiments of the present invention.

Reference will now be made to FIG. 5, in which there is illustrated an exemplary process for the security screening process 500 according to various embodiments of the present invention. As illustrated therein, there is provided according to various embodiments a streamlined and automated solution for screening packages slated for transport by one or more vehicles (e.g., screening of air cargo prior to transport thereof on aircraft, and the like). Exemplary and non-limiting advantages achieved include more consistent screening results, increased screening capacity, and reduced screening staffing requirements. The improved consistency is achievable in certain embodiments via integration with the security screening system described herein with one or more of an X-ray scanning system and a material handling system, both of which as will be detailed further below. The increased screening capacity and the reduced screening staffing requirements are achievable in certain embodiment at least in part due to the automation provided via the multi-tiered screening processes detailed herein, wherein in at least one embodiment the net volume of items screened per day may be doubled. In another embodiment, the net volume of items screened per hour may be tripled. Of course, a wide range of improved results may be obtainable, as should be understood from the description following herein.

As may be understood generally from FIG. 5, the screening process initiates upon receipt of localized data 501, which may include data indicative that one or more packages are entering the screening layout (see layout 700 of FIG. 12, illustrating unload locations, conveyor mechanism (see also FIG. 13, as described further below), X-ray imaging systems (see also FIG. 13), and sorting systems (see also FIG. 11)), data comprising one or more parameters associated with whether or not a package should be subjected to additional levels of screening, and/or data comprising one or more algorithms configured to automatically execute the multi-tiered and progressive levels of screening by the security screening system described herein. Thereafter, according to certain embodiments, Level 1 screening 502 is performed, which comprises an automated (i.e., unstaffed) process that obtains certain data from the packages as they pass through the screening layer.

If one or more of the parameters remain unsatisfied (i.e., if a threshold is not met, or if certain data (e.g., a package tracking number) is blurry as obtained, or the like), the security screening process proceeds to Level 2 screening 503. Therein, a brief manual assessment may be conducted according to various embodiments, whereby discrepancies or ambiguities in the obtained or viewed (e.g., via an XPG as described further below) data may be resolved. If unresolvable or otherwise triggering one or more parameters requiring additional screening, Level 3 screening 504 may commence. Therein, in an untimed environment additional screening may be conducted, which may in certain embodiments include the capture of new images/data from the packages. In certain instances where even this degree of scrutiny remains inconclusive, Level 4 screening 505 may be performed, whereby alternative screening methods (e.g., a materials handling screening process, as described further below) and additional data capture methods may be performed, again manually and in an untimed environment. Should Level 4 screening further fail, Level 5 screening 506, which consists of containment of the package until further notice/resolution commences.

It should be understood that according to various embodiments, at any point during the process illustrated in FIG. 5, should additional screening not be necessary, the package/item under scrutiny may—at that point—be released for additional sortation/transportation. This may be understood with reference as well to the high level data flow illustrated in FIG. 6, whereby as various levels of security screening are satisfied, disposition and sorting may occur, for example via integrated scanning and sorting systems, each of which as may incorporate additional levels of automation, as described elsewhere herein.

Figure 15B:
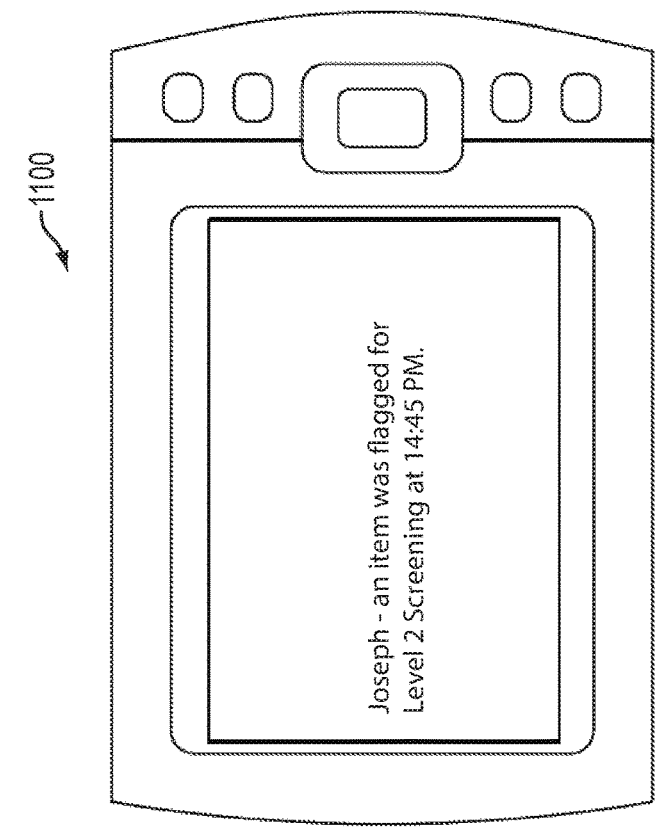
Figure 15A:
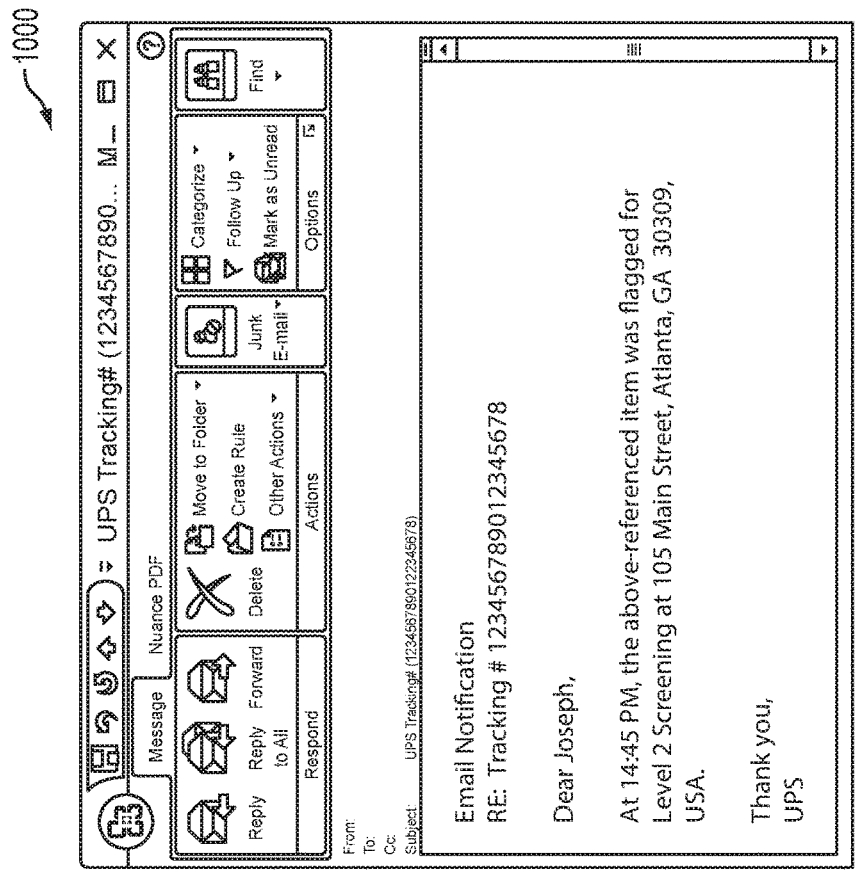

It should also be understood that according to various embodiments, at any point during the process illustrated in FIG. 5, one or more notifications or alerts may be generated by the security screening system and via the security screening process 500 described herein. Exemplary and non-limiting examples of notifications and/or alerts of this nature are provided in FIGS. 15A-B, whereby in FIG. 15A a manual threat assessor (whether primary or secondary, as described in further detail below) may receive an email notification 1000 that a particular item has been flagged for Level 2 screening 503, as of a certain time. FIG. 15B illustrates a comparable text notification 1100 that the same threat assessor may receive at a mobile device or the like (see FIG. 1) under the control of the threat assessor. As will be detailed elsewhere herein in conjunction with description of each of the discrete levels of screening (i.e., Levels 1-5), these types of notifications may be sent to one or more users of the system, either in a manual (e.g., in response to a user request for update) manner or in an automatic fashion (e.g., upon occurrence of a particular event within the analysis performed automatically via the security screening process 500 described herein.

In certain embodiments, flow rates may be additionally optimized by fully integrating the screening system described herein with a material handling system, such as of the type described in U.S. Pat. No. 8,386,277; the contents of which as are incorporated by reference herein in their entirety. A materials handling system is advantageous, for example, because in certain jurisdictions (e.g., the United States), distributors of controlled substances (i.e., a drug or chemical whose possession, use, or transport are regulated under the United States' Controlled Substance Act or otherwise, including prescription medications, narcotic drugs, and the like) are required to be registered by the Drug Enforcement Administration (DEA). Still further, under such regulations, a distributor must design and operate a system to disclose "suspicious orders" of controlled substances. Suspicious orders may include orders of unusual size, orders deviating substantially from a normal pattern, and orders of unusual frequency. Failure to do so may result in fines and/or loss of privilege to ship such substances.

In view of the above requirements, drug distributors (including carriers responsible for transporting controlled substances for such distributors typically institute a simple, threshold-based calculation to determine suspicious orders. For example, a customer may be assigned a monthly threshold for each family of controlled substances and if the customer attempts to place an order that exceeds its monthly threshold, the order is flagged as suspicious. However, this threshold approach simply sets a number (e.g., threshold) based on various factors and does not automatically adjust over time as more orders are received from customers. Further, this threshold approach does not consider other customers who may be placing orders for controlled substances within the same family. As a result, a customer's threshold may not be as accurate with regard to a "typical" customer who places orders for controlled substances in the same family. In addition, a customer threshold may become outdated (e.g., "stale") over time and not representative of what should be used to flag suspicious orders. As a consequence, the distributor's system may miss orders that should be flagged as suspicious and this may leave the distributor open to possible fines and/or loss of privilege to distribute such substances. Therefore, utilization of a comprehensive, integrated, and "smart" material handling system, such as of the type described in U.S. Pat. No. 8,386,277, the contents of which as are incorporated by reference herein in their entirety, proves advantageous in that it automatically accounts not only for the shipment being evaluated, but also historical order information for both the customer placing the order and for other similarly situated customers. Coupling this type of system only further enhances the integrated carrier review and government review (see also FIG. 11) achievable via the multi-tiered security screening process 500 (see FIG. 5 again) described herein.

An exemplary process utilized by a materials handling system such as of the type described in U.S. Pat. No. 8,386,277 may be understood with reference to FIG. 14, which illustrates an exemplary user interface depicting a series of checks that may be applied to a specific order received from customer ZZ12345678 for 400 units of Clonazepam (e.g., drug code 2737). The interface displays the results of each check performed for the order 901, 902, 903, 904. For instance, the interface displays that the order has failed checks one, two, and three. In addition, the interface provides selection mechanisms 905, 906 (e.g., buttons) that allow a user to view the control charts associated with the first check and the second check. Further, the interface provides a description of each check 907, 908, 909, 910 and the results of each check along with instructions based on the results 911, 912, 913, 914. Further details about the scope and nature of the checks and the results thereof, beyond what information is depicted in FIG. 14 may be understood with reference further to U.S. Pat. No. 8,386,277; the contents of which as again have been incorporated by reference herein in their entirety.

In certain embodiments, flow rates and/or consistency of screening results may also be additionally optimized by fully integrating the screening system described herein with a package X-ray screening system that utilizes an X-Ray penetration grid (XPG), such as of the type described in U.S. Patent Application Pub. No. 2015/0063539; the contents of which as are incorporated by reference herein in their entirety. An exemplary configuration of this nature may be understood with reference momentarily to FIG. 13, which illustrates an X-ray screening device (or system) 840 that includes an XPG 850 that comprises a radiopaque grid oriented such that the radiopaque grid elements are neither parallel nor perpendicular to the "direction of travel" of the conveying mechanism 841. In use. the item 810 to be scanned is oriented relative to the XPG such that, when the item and XPG are located between an X-ray emitter 842 and a detector 843, X-ray waves 845 produced by the X-ray emitter that pass through the item to be scanned must also pass through the XPG before reaching the detector. Because the radiopaque grid elements are evenly spaced apart and neither parallel nor perpendicular to the direction of travel of the conveying mechanism, no ghosted grid elements are visible in the generated image, such that radiopaque objects contained in a scanned item are easily and/or accurately identified in the generated image; further, a ghosting phenomenon encountered via conventional X-ray scanning systems is avoided, To better understand this phenomenon, it should be understood that generally when associating a mesh or grid structure with items to be scanned, the ghosting phenomenon described above may inadvertently cause at least a portion of the mesh or grid structure to appear visible in the created image, although the electromagnetic waves did not penetrate completely through the item. For example, ghosted streaks may appear to extend at least a portion of the grid elements in the created image and the resulting image may therefore show these ghosted streaks superimposed over items even where the electromagnetic waves did not penetrate completely through the item. Thus, the mesh or grid structure may be "ghosted" (i.e., appear) in a resulting scan image, even where the item being scanned has not, in reality, been fully (or sufficiently) penetrated to actually detect all portions of the conventional mesh or grid. Consequently, personnel viewing the created image may be led to believe that a complete scan through the entirety of an item was achieved. This "ghosting" phenomena is referred to herein as "ghosting," "ghosting lines," "ghost lines," "ghost images," "ghosted images," "ghost radiation," "ghost signals," and/or "ghosted lines," all of which as should be understood to generally and interchangeably describe this phenomena.

Historically, efforts to reduce the impact of ghosting have focused on creating improved detector elements, or incorporating complex algorithms utilized to minimize the impact of ghosting. However, such solutions are prone to errors due at least in part to electromagnetic noise and other imperfections in the received signal. For example, even where grids are used, if such are oriented in a manner that results in the grid lines thereof being parallel to the direction of travel, ghosted lines may appear, although such may contain certain distortions therein, While users could conceivably identify such distortions, the risk of a user overlooking a particular distortion remains prevalent. Thus, utilization of an X-ray scanning system that includes an XPG as described herein and as also described in further detail in U.S. Patent Application Pub. No. 2015/0063539, the contents of which as are incorporated by reference herein in their entirety substantially minimizes the impact of "ghosting" so as to ensure sufficient penetration of all scanned items without resorting to secondary item handling and the like.

It should be understood fr©m the above passages that according to those embodiments in which an X-ray scanning system and/or XPG are utilized, various characteristics of the items/packages being scanned may be determined in an automatic fashion. For example, various pieces of information may be read from a package label 1200, such as the type illustrated herein in FIG. 16. The information obtained may be in human-readable form, machine-readable form, and/or a combination of both. Still further, in certain embodiments, the information obtainable via utilization of the X-ray scanning system and/or XPG may include dimensional/volume/weight information associated with the item/package, which information may be utilized to automatically determine and/or validate shipping costs associated therewith.

2. Level 1 Screening Procedure(s)

Figure 6:
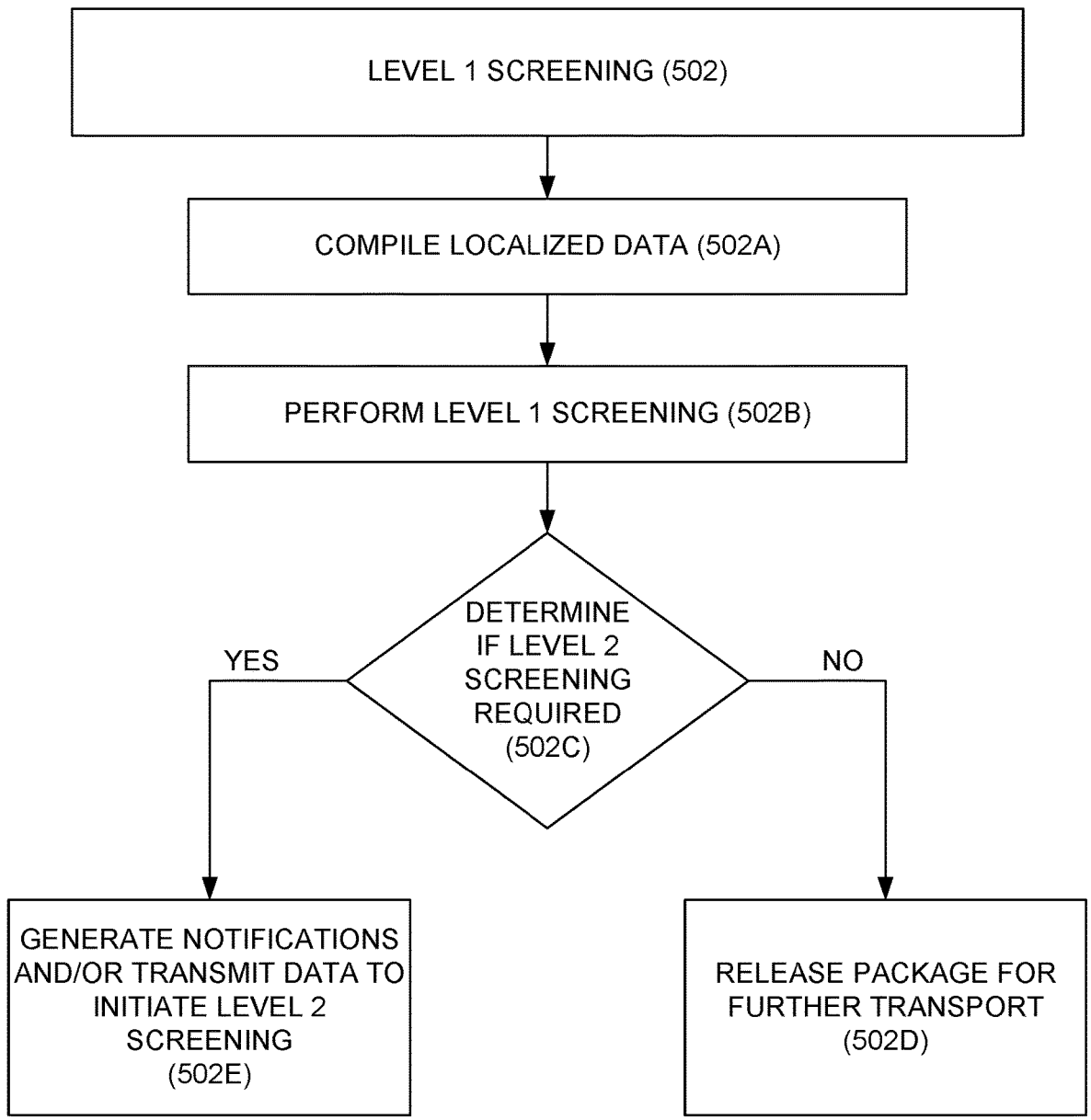

Reference will now be made to FIG. 6, in which there is illustrated an exemplary process flow for Level 1 Screening 502 procedures according to various embodiments of the present invention. According to various embodiments, this level of screening commences with the compilation or identification of at least certain localized data 502A, which may comprise at least some indication that one or more packages are entering a screening area, for example, via a conveyor mechanism as illustrated in FIGS. 12 and 13 and as described previously herein. Upon receipt of at least such an indication—which may in certain embodiments be received automatically from an operations or scanning system (see FIG. 11)—the Level 1 screening 502 commences in step 502B. Therein, an automated series of steps commences, including the capture of package tracking identifiers (e.g., a 1Z/PTN number or the like), the capture of an x-ray image of the package or item under review, and at least some portion of data required for generation of a screening decontrol message.

It should be understood that according to various embodiments, the screening decontrol message is configured to facilitate decontrol (i.e., release) of the package upon clearance of the package through (or at any stage of) the multi-tiered security screening process described herein. In certain embodiments, the screening decontrol message includes at least some combination of the following data elements: a record number, a system source type code, a record creation time and date stamp (GMT), a record type, a country code, a facility number, a package tracking identifier (1Z/PTN or the like), an event time and data stamp (GMT), a scanning user identifier (where manual scanning involved), a sort data, a sort code, a clear scan type (e.g., indicating the basis and level of release), a method of screening, a screening user number (where manual), a screening user last name, a screening user first name, a primary screening required indicator, a secondary screening required indicator, a record end indicator (e.g., a code that is machine-readable, wherein in certain embodiments the screening decontrol message is automatically generated and/or distributed to users of the system and/or to certain components or systems within or external to the screen system described herein). Of course additional and/or alternative data elements may be contained within the screening decontrol message, as may be desirable and/or particular advantageous in certain embodiments.

Returning now to FIG. 6, during step 502B and the performance of Level 1 screening according to various embodiments, a determination will be automatically made in step 502C as to whether Level 2 screen in is necessary. This determination in step 502C may be based upon various parameters and/or factors, including in certain embodiments in which an auto-sort engine may consider captured X-ray images of the item or package under review and in view thereof makes a comparison to a textual merchandise description associated with the item or package, and/or evaluates a commercial invoice further associated with the item or package so as to determine any discrepancies between any of the obtained and/or evaluated data. Where any discrepancies and/or ambiguities (e.g., differing data, blurriness in images obtained, or the like) exist, Level 1 screening 502 may proceed to step 502E, wherein Level 2 screening is initiated. Otherwise, where no discrepancies and/or ambiguities are identified, Level 1 screening proceeds to step 502D, wherein the package or item may be released for further transport/handling.

According to various embodiments, during step 502E one or more notifications may be generated as Level 2 screening is determined to be a necessity. Exemplary notifications and/or alert messages—as may be sent to one or more users of the system—are illustrated in at least FIGS. 15A-B. In conjunction with—or in certain embodiments concurrently with but separate from—one or more data items may be saved to the screening system or otherwise transmitted to one or more threat assessors (primary or secondary; remote or otherwise, all as will be detailed elsewhere herein) so that pertinent data is available and/or otherwise readily accessible for Level 2 screening, as described below. In certain embodiments, the notifications, alert messages, and/or data may be automatically transmitted during step 502E; in other embodiments, at least some portion of the data may only be transmitted upon request therefor by the Level 2 screening staff/personnel, however as may be deemed beneficial and/or desirable for various applications.

In these and still other embodiments, during step 502D, should it be automatically determined via the screening system that Level 2 screening is not necessary, release of the package or item for sorting, further transport and/or handling, or the like may involve generation of a decontrol message (as described previously herein). This message may likewise be manually or automatically transmitted to one or more users of the system for receipt thereby as in FIGS. 15A-B (or otherwise), for example via one or more devices (see FIG. 1) being used by the individual at that time. Still further, according to various embodiments, the decontrol message may be automatically transmitted to one or more sub-systems or systems—either internal or external to the screening system described herein—so as to facilitate continued automated (in part or in full) handling of the package or item. This may be understood, for example, with reference to FIG. 11, which illustrates at least a sorting system that may be automatically (or otherwise) utilized to further direct the package or item upon receipt of a disposition.

It should be understood with reference to both steps 502D and 502E, that upon disposition following Level 1 screening, one of two paths may be taken by the package or item under evaluation. Via step 502D, as described above, a sorting system or a further package handling system may be utilized to release the package or item from further screening or scrutiny. In an analogous fashion, via step 502E, the system according to various embodiments may be configured to automatically sort and/or reroute a package or item needing Level 2 screening in a direction (e.g., along a conveyor belt) different than that which would occur were Level 2 screening deemed unnecessary. With reference momentarily to FIG. 12, it may be understood according to various embodiments that where Level 2 screening is deemed necessary—for example following passage of the package or item through the X-ray scanner (visible and labeled as such in FIG. 12)—the package—upon being flagged for Level 2 screening may be held immediately downstream of the X-ray scanner for manual review by "L2 screeners"—as identified also in FIG. 12. In other embodiments, the packages/items may be otherwise diverted or handled for Level 2 screening; however, in all these and still other embodiments, it should be understood that no decontrol message—so as to release the package for transit and/or out of the screening process—would be generated pending Level 2 screening, the details of which as will be described further below.

3. Level 2 Screening Procedure(s)

Figure 7:
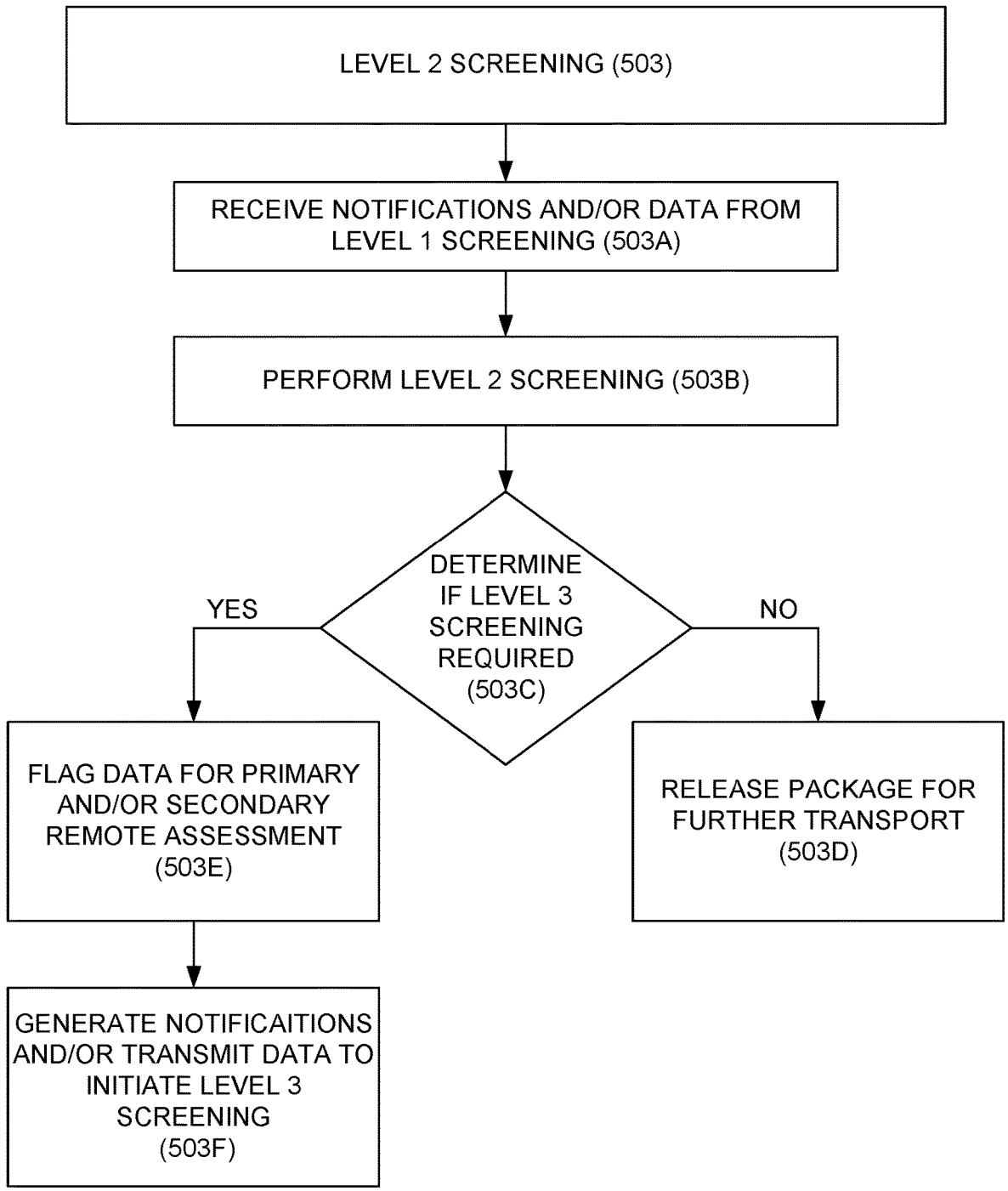

Reference will now be made to FIG. 7, in which there is illustrated an exemplary process flow for Level 2 Screening procedures according to various embodiments of the present invention. According to various embodiments, this level of screening commences upon receipt (by the screening system or by one or more users/assessors associated with the system) of one or more notifications and/or data that Level 2 screening is necessary and/or desirable. Following this occurring in step 503A, the process continues to step 503B, wherein Level 2 screening is performed, such that a determination may be made in step 503C as to whether or not Level 3 screening is required. If not, release of the package in step 503D may occur, in an analogous fashion as described herein with respect to release of a package following Level 1 screening in step 502D. If so, the Level 2 screening process continues to steps 503E and 503F, wherein appropriate flagging of the package or item for additional review or assessment occurs and wherein still further notifications and/or data are transmitted so as to facilitate that additional review or assessment.

Returning with reference to FIG. 7 to steps 503B and 503C, the performance of Level 2 screening so as to determine whether or not Level 3 screening is required involves according to various embodiments a manually performed and timed procedure. As illustrated in FIG. 12, in certain embodiments this procedure may be performed adjacent a conveying machine; in other embodiments, it may be performed remotely. In any of these and still other embodiments, it is envisioned, however, that Level 2 screening involve a manual assessment of the package or item under scrutiny, as compared to the automatic screening that occurred during Level 1. In this sense, Level 2 provides an additional layer of scrutiny, where deemed necessary and/or where otherwise the automated Level 1 screening may have identified discrepancies and/or otherwise been deemed insufficient for a certain package or item. It should be understood, however, that is desirable for, via the screening system described herein, that a majority of packages pass Level 1 screening without the need for additional (e.g., Levels 2-5) screening.

According to various embodiments, as mentioned, Level 2 screening in steps 503B and 503C is performed under a time constraint by an identified Level 2 Screen personnel. In certain embodiments, only one individual will perform Level 2 screening upon any particular package, although in other embodiments, a secondary or redundant screening personnel may be utilized. In at least one embodiment utilizing a single Level 2 screener, the time constraint may be within a range of 12 to 20 seconds. In other embodiments, the time constraint may be less than 12 seconds or greater than 20 seconds, with the understanding that in these and still other embodiments the time constraint for Level 2 screening will be relatively short (e.g., less than a couple minutes, at most).

According to various embodiments, where Level 2 screening is invoked, in addition to the time constraint for review described above, a time constraint may be placed upon the timing for transmission of supporting data to the Level 2 screeners for conducting of the Level 2 screening. In certain embodiments, at least the captured x-ray image of the package, the determined tracking identifier, and some portion of data necessary so as to generate a decontrol message (if appropriate, following Level 2 screening) must be provided to a global repository. In at least one embodiment, these types of data must be provided within one minute of capturing the x-ray image. In other embodiments, the data must be provided within one minute of a determination that Level 2 screening is necessary. In still other embodiments, although greater than one minute, it should be understood that the data provided is accessible to Level 2 screeners in a near real-time fashion.

According to various embodiments, in addition to timing constraints for data provision and data review by Level 2 screeners, initiation of Level 2 screening triggers further timing constraints relative to various types of data handled and/or otherwise transmitted by the screening system described herein. In certain embodiments, the global repository must not only have the image available for viewing within approximately five minutes of the x-ray image capture (or of a determination that Level 2 screening is necessary), but any such flagged images for a particular package or item must be retained for at least thirty days following the capture thereof In other embodiments, viewing may be within a relative short time period (between 2 and 10 minutes following image capture or Level 2 screening flagging); likewise, image retention may be for greater than (or less than) 30 days, however as may be desirable. As another non-limiting example, images may be retained for 60 days. In any of these and still other embodiments, it should be understood that in addition to the images being retained, it may be further required that all data provided for and generated via Level 2 screening be retained, as outlined herein, for example for a certain period of retention time. This information should be globally accessible, for example via a global repository, as described previously herein.

Returning now with reference to FIG. 7, where Level 2 screening determines that Level 3 screening is necessary, step 503E involves the flagging of data for primary and/or secondary remove assessment. Remote assessment during Level 3 should, as an initial matter, be contrasted with the proximate assessment during Level 2 screening, the latter as may be understood with reference to the Level 2 screeners positioned adjacent to a conveyor mechanism in FIG. 12. For initiating remote assessment during Level 3 screening, upon determination that such is necessary, in certain embodiments, at least some portion of the data associated with a package or item (e.g., an image thereof, the 1Z/PTN number, or the like) may be flagged for primary and/or secondary remote assessment, as will be described elsewhere herein. So flagging the data for primary and/or secondary remote assessment in step 503E (which assessment will occur during Level 3 screening, described further below) will cause generation of one or more notifications and/or the transmission of data necessary for identified primary and/or secondary remote assessors to perform the requisite Level 3 screening. As mentioned previously herein, the data may be transmitted separately from the one or more notifications, such that—as a non-limiting example—the data may be retrieved only upon actual initiation of Level 3 screening by the Level 3 assessor(s).

In certain embodiments, it should also be understood that the notifications generated in step 503F may be not only to the Level 3 assessors, but also to other users associated with the screening system described herein. For example, supervisory personnel may wish to be notified of all packages triggering Level 3 screening requirements. As another non-limiting example, triggering of Level 3 screening requirements may trigger one or more external notifications, such as to a government or third-party assessor, operating as a "fail-safe" of sorts where this degree of scrutiny is deemed necessary over a particular package or item. It should be understood in these and other scenarios described elsewhere herein (e.g., for Level 4 screening), decontrol of the package or item from the screening process described herein (or from under the control of the screening system described herein) may require—where manual assessments are involved—sign-off or some sort of authorization from all personnel actively reviewing the package or item; authorization or sign-off from one assessor where more than one are involved will in these and other embodiments be insufficient to trigger release of the package or item via generation of a decontrol message or otherwise.

4. Level 3 Screening Procedure(s)

Figure 8:
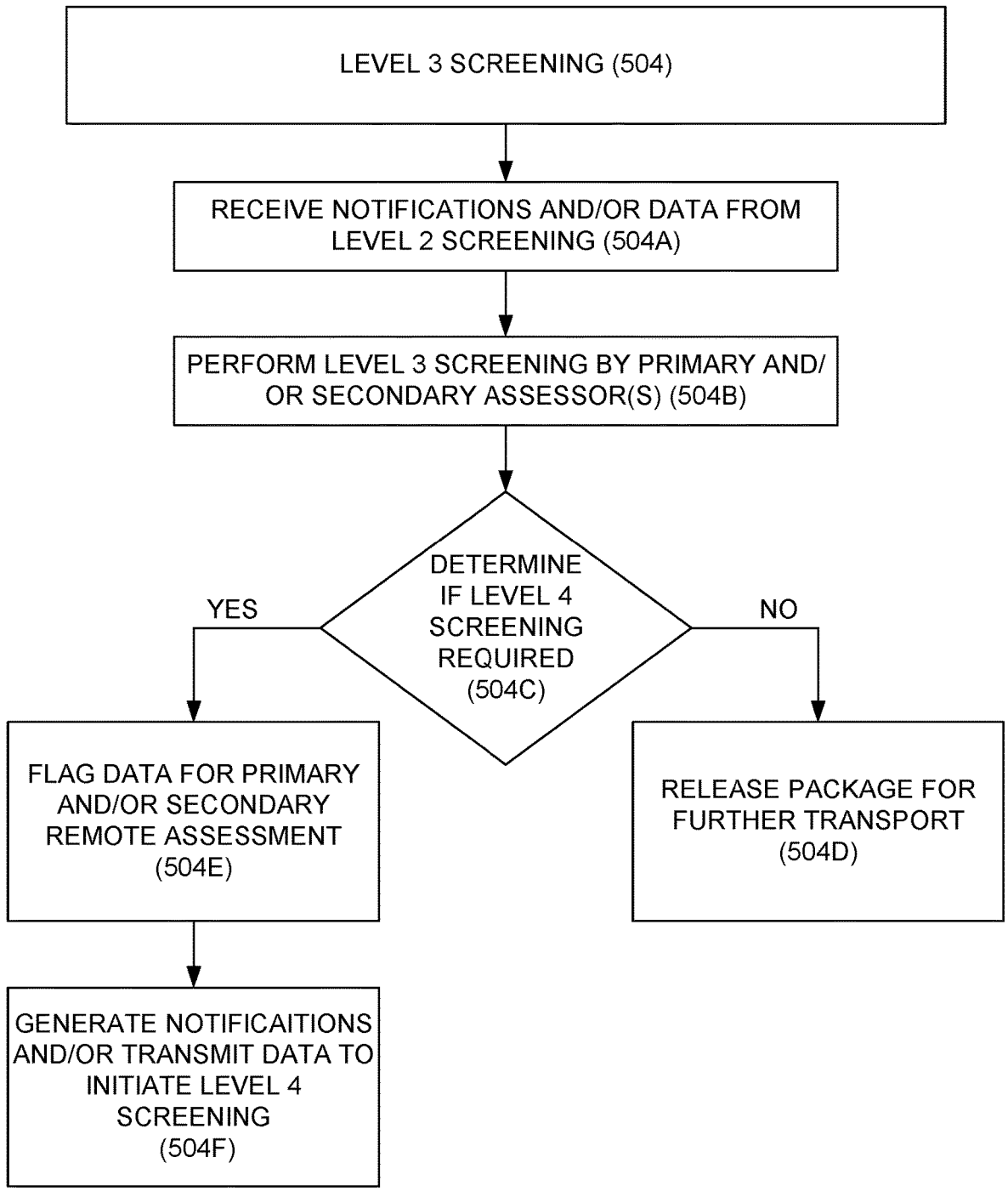

Reference will now be made to FIG. 8, in which there is illustrated an exemplary process flow for Level 3 Screening procedures according to various embodiments of the present invention. According to various embodiments, this level of screening commences upon receipt (by the screening system or by one or more users/assessors associated with the system) of one or more notifications and/or data that Level 3 screening is necessary and/or desirable. Following this occurring in step 504A, the process continues to step 504B, wherein Level 3 screening is performed, such that a determination may be made in step 504C as to whether or not Level 4 screening is required. If not, release of the package in step 504D may occur, in an analogous fashion as described herein with respect to release of a package following Level 1 screening in step 502D. If so, the Level 3 screening process continues to steps 504E and 504F, wherein appropriate flagging of the package or item for additional review or assessment occurs and wherein still further notifications and/or data are transmitted so as to facilitate that additional review or assessment.

Returning with reference to steps 504B and 504C of FIG. 8, the performance of Level 3 screening so as to determine whether or not Level 4 screening is required involves according to various embodiments a manually performed and untimed procedure. In certain embodiments, Level 4 screening will remotely share not only the obtained x-ray image and at least a merchandise description (and potentially further data—for example a commercial invoice) via the global repository for access thereby by at least a primary remote assessor, but also initiate alternative screening procedures, such as that described elsewhere herein for materials handling (see also FIG. 14). For purposes of conducting any of these remote assessments, one primary remote assessor and up to five secondary remote assessors may be maintained. In at least one embodiment, flagging the image for primary remote assessment (which may occur during the conclusion of Level 3 screening) will automatically notify the primary remote assessor requesting assistance and providing a link to at least the package image. The primary remote assessor may then, during the course of Level 4 screening during steps 505B and 505C request and/or otherwise obtain further information so as to conduct the requisite assessment.

In certain embodiments, flagging an image or package for primary remote assessment may be supplemented by secondary assessment. If such assistance is needed from a secondary remote assessor, the image will be flagged not only for primary but also for secondary assessment. As a result, in these and other embodiments, at least one secondary assessor will be selected from a list of available (e.g., the up to five secondary assessors) secondary assessors, and a notification will be generated and transmitted to the secondary remote assessor selected. In at least one embodiment, an image may be flagged for one primary and one secondary remote assessor; in still another embodiment, an image may be flagged for one primary and up to five secondary remote assessors. In yet other embodiments, multiple primary and/or multiple (and more than five) secondary remote assessors may be available and/or selected for conducting of Level 4 screening, depending upon the degree of scrutiny desired. Certain assessors at Level 4 may be internal to the carrier; others may be external, including for example the provision of a third party government-based assessor, which may be beneficial where the item being transported in the package is a regulated substance or the like, as will be described elsewhere herein.

According to various embodiments, in addition to or instead of the primary and secondary remote assessment described above, alternative screening procedures may be implements, whether manually or in an automated fashion. In at least one exemplary embodiment, an at least partially automated materials handling screening process, configured to further identify and determine whether a package is suspicious or not based at least in part upon the contents thereof, may be employed, as described previously herein. Any one or more of additional or alternative screening processes may be employed in this fashion during Level 4 screening, either internally by the carrier or externally thereto and external to the screening system described herein. It should be understood, however, that throughout such features are integrated—at least in part—with the security screening system described herein, at least in so far as necessary to complete Level 4 screening, as outlined in FIG. 9. It should also be understood that manual capture in Level 4 may include not only of a new x-ray image, but of also additional screening data and/or a package tracking identifier—all as may be necessary for regeneration (validation) of a decontrol message upon completion of Level 4 screening or otherwise.

As mentioned, according to various embodiments, during Level 4 screening the remote assessors (primary or secondary) may only be able to see the x-ray images flagged for remote assessment, with that visibility being provided via the global imaging system (i.e, the global repository) described elsewhere herein. In certain embodiments, a new x-ray image may be requested and obtained during Level 4 screening. In at least one embodiment that may occur via coordinated electronic communication between the Level 4 assessors and on-site screening or operation personnel at the conveyor mechanism.

Returning now to FIG. 9, should the package be designated for release following Level 4 screening, a decontrol message may be generated and provided within the system. In certain embodiments this may occur in an automated fashion; in other embodiments, at least some degree of manual capture of certain data necessary for generation of a screening decontrol message (as described previously herein) may be involved. As a non-limiting example, in at least one embodiment, the names and identifies of the primary (and/or secondary) Level 4 threat assessors may be manually entered and/or at least validated by the assessors themselves.

According to various embodiments, as mentioned, above, even Level 4 screening may remain insufficient to satisfy one or more parameters or conditions so as to permit generation of a screening decontrol message and/or release of the package from the security screening process described herein. In such instances, Level 4 screening may be requested and/or otherwise initiated via step 505F, which request/initiation may occur in a similar fashion to that involved with passage of the screening process from Level 1 to Level 2 and/or Level 2 to Level 3 and/or Level 3 to Level 4, all as detailed previously herein.

5. Level 4 Screening Procedure(s)

Figure 9:
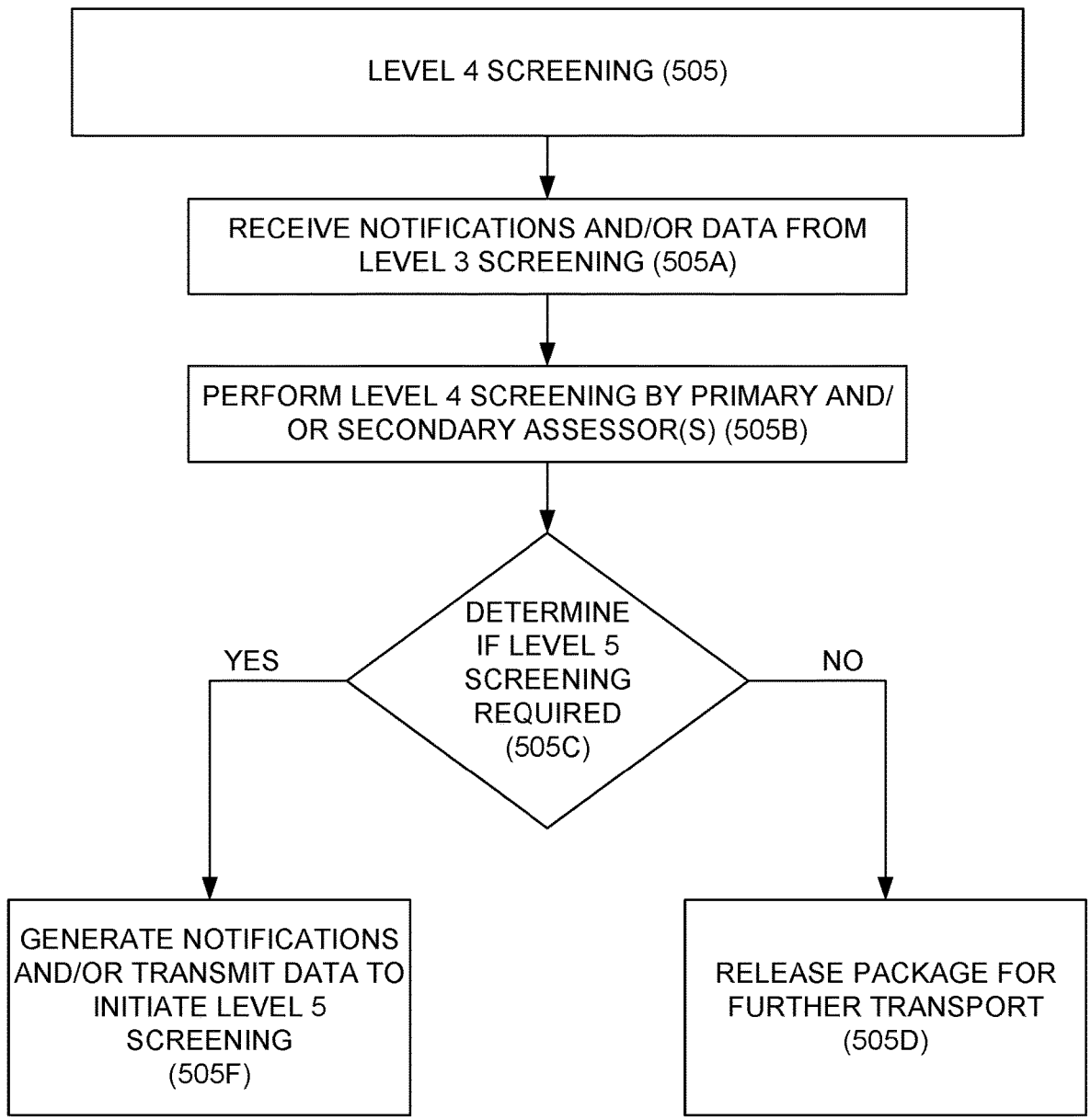

Reference will now be made to FIG. 9, in which there is illustrated an exemplary process flow for Level 4 Screening procedures according to various embodiments of the present invention. According to various embodiments, this level of screening commences upon receipt (by the screening system or by one or more users/assessors associated with the system) of one or more notifications and/or data that Level 4 screening is necessary and/or desirable. Following this occurring in step 505A, the process continues to step 505B, wherein Level 4 screening is performed, such that a determination may be made in step 505C as to whether or not Level 5 screening is required. If not, release of the package in step 505D may occur, in an analogous fashion as described herein with respect to release of a package following Level 1 screening in step 502D. If so, the Level 4 screening process continues to steps 505E and 505F, wherein appropriate flagging of the package or item for additional review or assessment occurs and wherein still further notifications and/or data are transmitted so as to facilitate that additional review or assessment.

Returning with reference to steps 505B and 505C of FIG. 9, the performance of Level 4 screening so as to determine whether or not Level 5 screening is required involves according to various embodiments a manually performed and untimed procedure, much like that performed under Level 3 screening. In certain embodiments, Level 3 screening will remotely share the obtained x-ray image and at least a merchandise description (and potentially further data—for example a commercial invoice) via the global repository for access thereby by at least a primary remote assessor, as may have been identified during the conclusion of Level 2 screening, as described above. In at least one embodiment, one primary remote assessor and up to five secondary remote assessors may be maintained. In at least this embodiment, flagging the image for primary remote assessment (which may occur during the conclusion of Level 2 screening) will automatically notify the primary remote assessor requesting assistance and providing a link to at least the package image. The primary remote assessor may then, during the course of Level 3 screening during steps 504B and 504C request and/or otherwise obtain further information so as to conduct the requisite assessment.

In certain embodiments, flagging an image or package for primary remote assessment may be supplemented by secondary assessment. If such assistance is needed from a secondary remote assessor, the image will be flagged not only for primary but also for secondary assessment. As a result, in these and other embodiments, at least one secondary assessor will be selected from a list of available (e.g., the up to five secondary assessors) secondary assessors, and a notification will be generated and transmitted to the secondary remote assessor selected. In at least one embodiment, an image may be flagged for one primary and one secondary remote assessor; in still another embodiment, an image may be flagged for one primary and up to five secondary remote assessors. In yet other embodiments, multiple primary and/or multiple (and more than five) secondary remote assessors may be available and/or selected for conducting of Level 3 screening, depending upon the degree of scrutiny desired. Certain assessors at Level 3 may be internal to the carrier; others may be external, including for example the provision of a third party government-based assessor, which may be beneficial where the item being transported in the package is a regulated substance or the like, as will be described elsewhere herein.

According to various embodiments, during Level 3 screening the remote assessors (primary or secondary) may only be able to see the x-ray images flagged for remote assessment, with that visibility being provided via the global imaging system (i.e, the global repository) described elsewhere herein. In certain embodiments, a new x-ray image may be requested and obtained during Level 3 screening. In at least one embodiment that may occur via coordinated electronic communication between the Level 3 assessors and on-site screening or operation personnel at the conveyor mechanism.

Returning now to FIG. 8, should the package be designated for release following Level 3 screening, a decontrol message may be generated and provided within the system. In certain embodiments this may occur in an automated fashion; in other embodiments, at least some degree of manual capture of certain data necessary for generation of a screening decontrol message (as described previously herein) may be involved. As a non-limiting example, in at least one embodiment, the names and identifies of the primary (and/or secondary) Level 3 threat assessors may be manually entered and/or at least validated by the assessors themselves.

According to various embodiments, as mentioned, above, even Level 3 screening may remain insufficient to satisfy one or more parameters or conditions so as to permit generation of a screening decontrol message and/or release of the package from the security screening process described herein. In such instances, Level 4 screening may be requested and/or otherwise initiated via step 504F, which request/initiation may occur in a similar fashion to that involved with passage of the screening process from Level 1 to Level 2 and/or Level 2 to Level 3, both as detailed previously herein.

6. Level 5 Screening Procedure(s)

Figure 10:
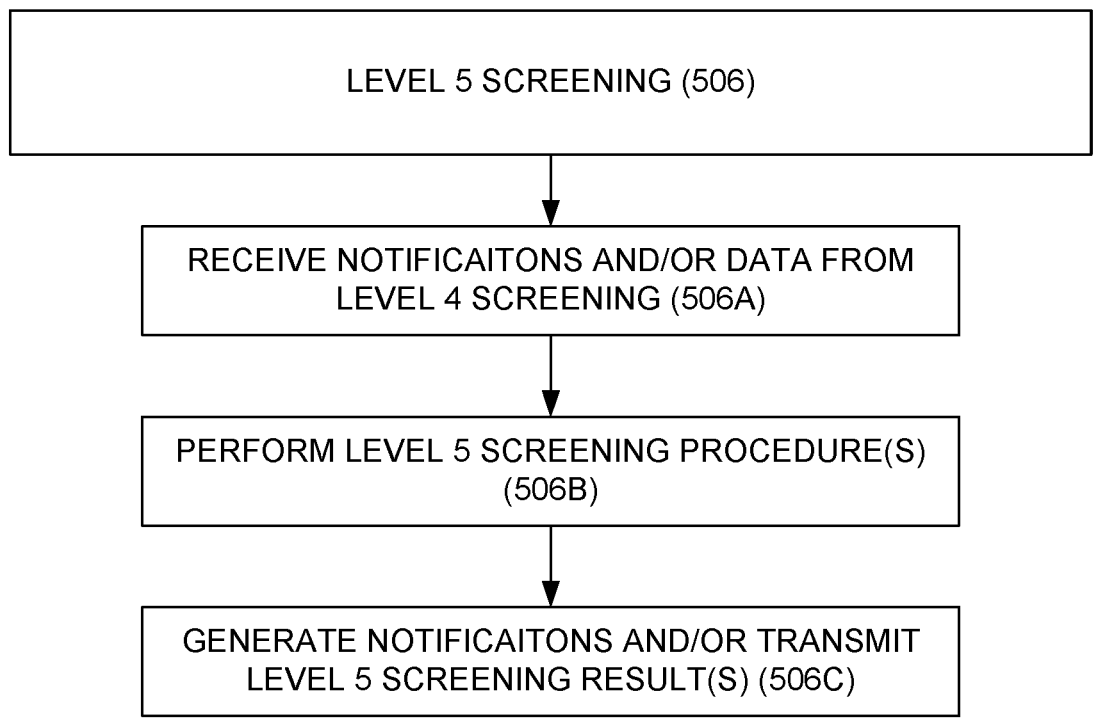

Reference will now be made to FIG. 10, in which there is illustrated an exemplary process flow for Level 5 Screening procedures according to various embodiments of the present invention. According to various embodiments, this level of screening commences upon receipt (by the screening system or by one or more users/assessors associated with the system) of one or more notifications and/or data that Level 5 screening is necessary and/or desirable. Following this occurring in step 506A, the process continues to step 506B, wherein Level 3 screening is performed, such that a determination may be made regarding further handling of the package in step 506C. In at least one embodiment, Level 5 screening entails containment of confirmed suspicious or noncompliant packages. In certain embodiments containment may be indefinite; in other embodiments, one or more additional actions may be taken so as to potentially mitigate the containment of the package. As a non-limiting example, one or more notifications of the containment and/or data associated otherwise with the Level 5 screening result(s) may be transmitted to one or more users associated with the security screening system described herein.

7. General Observations Regarding Levels 1-5 Screening Processes

As will be recognized, as a package or item leaves or is released from each level of screening, either an automated screening decontrol message will be generated by the screening system or a manual security decontrol message will be captured from data compiled by one or more manual/remote threat assessors. In certain embodiments, even where control is passed to a subsequent level (e.g., passage from Level 1 to Level 2 for further screening, as compared to clearance out of the system from Level 1 alone), a decontrol message will be generated, such that a decontrol message will be captured and retained for each of the multiple levels of screening undergone by a particular package or item. The system may be configured in certain embodiments to consolidate or otherwise group decontrol messages for multiple levels of a single package screening prior to transmission of the final decontrol message, so as to ensure final sort/handling requests are made on the basis of a final decontrol message, versus one prior incurred.

As will also be recognized, where throughout various automatic and/or manual operations have been described relative to certain of the Levels 1-5 of the screening process herein, in certain embodiments levels beyond Level 1 may be automated, in part or in full, as may be desirable or advantageous for particular applications. In still other embodiments, where time constraints have been outlined herein, it should be understood that specific time durations—whether for review, provision of data, or retention of data—are exemplary and non-limiting in nature. Across all embodiments, it should be understood that review and provision of data should be done in a relative timely, even in a near real-time fashion, whereas data retention should be relatively more long-term focused, depending upon priorities and/or system requirements for particular applications. For example, data retention may need to be much longer than thirty (30) days in some instances where sensitive government-related materials are being transported.

According to various embodiments, where indicated that primary and/or secondary threat assessors may access or otherwise obtain certain data—including x-ray images, merchandise descriptions, commercial invoices, and the like—it should be understood that such data may in certain embodiments not only be electronically accessible, but also printable or otherwise transmittable by the assessors. Data may likewise be accessed and/or printed (and/or otherwise handled) by individuals who are users of the screening system but not assessors, as may be desirable. For instance, a supervisor may wish to access and/or print all Level 4 screening associated data for packages handled under his/her supervision.

According to various embodiments described herein, internal staffing personnel (e.g., Level 2 screeners) are able to view and/or print images, merchandise descriptions, commercial invoices, and other such data, as outlined above, and also able to flag images or any portion of the data accessed and assessed, whereby the flags placed or associated therewith are also conveyed to the receiving party thereof. In this manner, external assessors and/or government assessors may be restricted to accessing only that data which is flagged, which in some instances may be less than all of the data associated with a particular package, as may be desirable in certain instances.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for screening a plurality of packages containing therein one or more items for transit via a carrier, the method comprising via one or more computer processors:

based at least in part on an x-ray emitter that emits electromagnetic waves through a package and onto an x-ray penetration grid as the package traverses a conveying mechanism, obtaining previous screening data, the previous screening data including a first x-ray image of the package and first screening decontrol data;

responsive to the obtaining of the previous screening data, automatically determining whether a subsequent screening procedure of the package is required based on a discrepancy between at least a first portion of the previous screening data and at least one predefined parameter;

responsive to determining that the subsequent screening procedure of the package is required, automatically generating and transmitting via the one or more computing processors, one or more notifications configured to cause the subsequent screening procedure to be completed within a predetermined time duration; and in response to the transmitting and based on the determining that the subsequent screening procedure of the package is required, automatically executing the subsequent screening procedure of the package within the predetermined time duration, wherein the subsequent screening procedure comprises a plurality of checks for the package comprising at least:

determining that the package comprises an order and determining whether an order quantity of the order is greater than a first upper control limit value, the first upper control limit value being derived from historical orders for a first subset of historical orders comprising the historical orders with a historical customer identifier that matches a particular customer identifier associated with the order, and in response to the order quantity being greater than the first upper control limit value, marking the order as suspicious.

2. The computerized method of claim 1, wherein execution of the subsequent screening procedure further comprises a recapture of a new x-ray image of the package.

3. The computer implemented method of claim 1, wherein a previous screening procedure comprises: capturing and storing a screening data associated with the package, the screening data including one or more manually entered indicators and a screening decontrol data.

4. The computerized method of claim 3, wherein the previous screening procedure is performed under a time constraint in a range of 12 to 20 seconds.

5. The computer implemented method of claim 3, wherein responsive to determining that the subsequent screening procedure is not required, generating and transmitting a screening decontrol message containing at least the screening decontrol data, and wherein the screening decontrol message is configured to release the package from further screening procedures.

6. The computer implemented method of claim 5, wherein the screening decontrol message further contains: a package tracking identifier, a record number, a system source type code, a record creation time and date stamp, a record type, a country code, a facility number, an event time and date stamp, a scanning user identifier, a sort date, a sort code, a clear scan type, a method of screening identifier, a screening user number, and a record end indicator.

7. The computerized method of claim 1, wherein the previous screening data comprises one or more manually entered assessments.

8. The computerized method of claim 1 further comprising:
automatically and electronically determining whether a successive screening procedure of the package is required, wherein the determining the successive screening procedure is of the package is required is based on an identification of a discrepancy between at least a portion of the subsequent screening data and at least one predefined parameter;
responsive to determining that the successive screening is required, executing the successive screening procedure.

9. The computerized method of claim 8, wherein responsive to determining that the successive screening procedure is not required, generating and transmitting a screening decontrol message containing at least the subsequent screening decontrol data, and wherein the screening decontrol message is configured to release the package from further screening procedures.

10. The computerized method of claim 8, wherein the successive screening procedure comprises containment of the package so as to prevent release and/or further transport thereof.

11. The computerized method of claim 1, wherein the plurality of checks further comprise at least one of:
calculating a period of time between an order date for the order and a ship date for a previous consecutive historical order from the historical orders with the historical customer identifier that matches the particular customer identifier associated with the order, determining whether the order quantity is greater than a second upper control limit value, the second upper control limit value being derived from the period of time and historical quantities for a second subset of the historical orders, the second subset of the historical orders comprising the historical orders with the historical customer identifiers that match the particular customer identifier associated with the order, and in response to the order quantity being greater than the second upper control limit value, marking the order as suspicious;
determining whether the order quantity is greater than a first threshold value, the first threshold value being derived from the historical quantities for a third subset of the historical orders, the third subset of the historical orders comprising the historical orders with the historical customer identifiers that match the particular customer identifier associated with the order, and in response to the order quantity being greater than the first threshold value, marking the order as suspicious; or
determining whether the order quantity is greater than a second threshold value, the second threshold value being derived from the historical quantities of the historical orders, and in response to the order quantity being greater than the second threshold value, marking the order as suspicious.

12. One or more non-transitory computer storage devices having computer-readable program code portions stored therein, the computer-readable program code portions comprising:
a first executable portion configured for automatically obtaining previous screening data based at least in part on an x-ray emitter that emits electromagnetic waves through a package and onto an x-ray penetration grid, the previous screening data including a first x-ray image of the package and first screening decontrol data;
a second executable portion configured for automatically determining whether a subsequent screening procedure is required for the package based on a discrepancy between the previous screening data and at least one predefined parameter;
a third executable portion configured for responsive to determining that the subsequent screening procedure is required, generating and transmitting one or more notifications configured to cause the subsequent screening procedure to be completed within a predetermined time duration; and
a fourth executable portion configured for automatically executing the subsequent screening procedure for the package within the predetermined time duration in response to the transmitting and based on the determining that the subsequent screening procedure for the package is required, wherein the subsequent screening procedure for the package includes a plurality of checks to determine whether the package may be characterized as a suspicious package, wherein the plurality of checks comprises execution of a material handling procedure, wherein the material handling procedure comprises at least:
determining that the package comprises an order and determining whether an order quantity of the order is greater than a first upper control limit value, the first upper control limit value being derived from historical orders for a first subset of historical orders comprising the historical orders with a historical customer identifier that matches a particular customer identifier associated with the order, and in response to the order quantity being greater than the first upper control limit value, marking the order as suspicious.

13. The one or more non-transitory computer storage devices of claim 12, the computer-readable program code portions further comprising:
a second executable portion configured for, responsive to determining that the subsequent screening is not required, generating and transmitting a screening decontrol message containing at least a screening decontrol data that is retrieved from the preceding screening data captured and stored from the preceding screening procedure of the package, wherein the screening decontrol message is configured to release the package from further screening procedures.

14. The one or more non-transitory computer storage devices of claim 12, the computer-readable program code portions further comprising a third executable portion configured for automatically and electronically executing an initial screening procedure prior to executing other screening procedures including the subsequent screening procedure, wherein executing the initial screening procedure comprises capturing and storing an initial screening data associated with the package, the initial screening data including an x-ray image and an initial screening decontrol data.

15. The one or more non-transitory computer storage devices of claim 14, the computer-readable program code further comprising a fourth executable portion configured for automatically and electronically determining whether an intermediate screening procedure is required for the package, and responsive to determining that the intermediate screening procedure is required, executing the intermediate screening procedure and capturing and storing, an intermediate screening data associated with the package, the intermediate screening data including one or more manually entered indicators and an intermediate screening decontrol data, and wherein the intermediate screening procedure is performed after the initial screening procedure, but prior to the subsequent screening procedure.

16. The one or more non-transitory computer storage devices of claim 14, wherein execution of the subsequent screening procedure further comprises a recapture of a new x-ray image.

17. The one or more non-transitory computer storage devices of claim 12, wherein the plurality of checks further comprise at least one of:

calculating a period of time between an order date for the order and a ship date for a previous consecutive historical order from the historical orders with the historical customer identifier that matches the particular customer identifier associated with the order, determining whether the order quantity is greater than a second upper control limit value, the second upper control limit value being derived from the period of time and historical quantities for a second subset of the historical orders, the second subset of the historical orders comprising the historical orders with the historical customer identifiers that match the particular customer identifier associated with the order, and in response to the order quantity being greater than the second upper control limit value, marking the order as suspicious;

determining whether the order quantity is greater than a first threshold value, the first threshold value being derived from the historical quantities for a third subset of the historical orders, the third subset of the historical orders comprising the historical orders with the historical customer identifiers that match the particular customer identifier associated with the order, and in response to the order quantity being greater than the first threshold value, marking the order as suspicious; or determining whether the order quantity is greater than a second threshold value, the second threshold value being derived from the historical quantities of the historical orders, and in response to the order quantity being greater than the second threshold value, marking the order as suspicious.

18. The computerized method of claim 1, wherein the x-ray penetration grid comprises a radiopaque grid with elements that are neither parallel nor perpendicular to a direction of travel of the conveying mechanism.

* * * * *